US006481632B2

(12) United States Patent
Wentker et al.

(10) Patent No.: US 6,481,632 B2
(45) Date of Patent: *Nov. 19, 2002

(54) DELEGATED MANAGEMENT OF SMART CARD APPLICATIONS

(75) Inventors: David C. Wentker, San Francisco, CA (US); Klaus P. Gungl, Sindelfingen (DE)

(73) Assignee: Visa International Service Association, San Francisco, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/427,517

(22) Filed: Oct. 26, 1999

(65) Prior Publication Data

US 2002/0040936 A1 Apr. 11, 2002

Related U.S. Application Data

(60) Provisional application No. 60/121,810, filed on Feb. 25, 1999, provisional application No. 60/124,130, filed on Mar. 12, 1999, and provisional application No. 60/105,841, filed on Oct. 27, 1998.

(51) Int. Cl.[7] .............................................. G06K 19/06
(52) U.S. Cl. ........................ 235/492; 235/376; 235/380; 235/382; 235/487
(58) Field of Search ................................ 235/380, 492, 235/487, 376, 382

(56) References Cited

U.S. PATENT DOCUMENTS

| 4,742,215 A | 5/1988 | Turpen et al. ............... 235/487 |
| 4,831,245 A | 5/1989 | Igasawara | |

(List continued on next page.)

FOREIGN PATENT DOCUMENTS

| AT | E100227 | 11/1994 |
| DE | 19607363 | 9/1996 |

(List continued on next page.)

OTHER PUBLICATIONS

Carol Hovenga Fancher, "In Your Pocket SmartCard", Feb. 1997, IEEE Specturm.

(List continued on next page.)

*Primary Examiner*—Karl D. Frech
*Assistant Examiner*—Seung Ho Lee
(74) *Attorney, Agent, or Firm*—Beyer Weaver & Thomas, LLP

(57) ABSTRACT

A smart card architecture includes a run-time environment, a card manager, one or more security domains, a provider application and an issuer application. One or more APIs provide communication. The life cycle of the card and card manager includes states: Pre-production, Ready, Initialized, Secured, Locked and Terminated. The life cycle of an application includes states: Installed, Selectable, Personalized, Blocked, Locked and Deleted. A card registry keeps track of card manager and application data elements. The functionality of a security domain on a smart card is extended to allow it to perform delegated management of smart card applications: delegated loading, installation and/ or deletion of an application. A provider of an application is assured of more direct control and management of their application, yet an issuer still maintains some control over the management of the card. The card issuer empowers application providers to initiate changes to the issuer's smart cards that are pre-approved by the card issuer. A method of delegated loading of an application onto a smart card first receives a load command from an application provider via a card acceptance device. The load command includes an indication of an application to be loaded and an appended command authentication pattern. Next, the load command is verified using the command authentication pattern. Then, an application is received from an application provider via the card acceptance device; the application also includes an appended application authentication pattern which is used to verify the application. Finally, the application is loaded into memory of the smart card.

16 Claims, 14 Drawing Sheets

U.S. PATENT DOCUMENTS

| | | | | |
|---|---|---|---|---|
| 5,332,889 | A | | 7/1994 | Lundstrom et al. .......... 235/380 |
| 5,378,884 | A | | 1/1995 | Lundstrom et al. .......... 235/441 |
| 5,530,232 | A | | 6/1996 | Taylor ......................... 235/380 |
| 5,578,808 | A | * | 11/1996 | Taylor ......................... 235/380 |
| 5,583,933 | A | | 12/1996 | Mark ........................... 379/355 |
| 5,901,303 | A | | 5/1999 | Chew ........................... 395/400 |
| 5,923,884 | A | * | 7/1999 | Pryret et al. ................. 395/712 |
| 6,005,942 | A | * | 12/1999 | Chan et al. ................... 235/380 |
| 6,164,549 | A | * | 12/2000 | Richards ...................... 235/492 |
| 6,167,521 | A | * | 12/2000 | Smith et al. ................. 713/200 |

FOREIGN PATENT DOCUMENTS

| | | |
|---|---|---|
| EP | 0193635 | 9/1986 |
| EP | 0658862 | 6/1995 |
| EP | 0795844 | 9/1997 |
| EP | 0798673 | 10/1997 |
| WO | 98/43212 | 10/1998 |

OTHER PUBLICATIONS

Chaum et al., "SmartCard 2000: The Future of IC Cards", Oct. 19, 1987, Elsevier Science Publishers, B.V.

Steven Levy, "E–Money (That's What I Want)", Dec. 1994, Wired Magazine.

Carol H. Fancher, "Smart Cards as Potential Applications Grow, Computers in the Wallet are Making Unobstrusive Inroads", Aug. 1996, Scientific American Website.

Jerome Svigals, "Smart Cards The New Bank Cards", 1985, MacMillan Publishing Company.

Roy Bright, "SmartCards: Principles, Practice, Applications", 1998, Ellis Horwood Limited.

Jerome Svigals, "SmartCards The Ultimate Personal Computer", 1985, MacMillan Publishing Company.

Hawkes et al., "Integrated Circuit Cards, Tags and Tokens", 1990, BSP Professional Books.

David Naccache, "Cryptographic Smart Cards", Jun. 3, 1996, IEEE Micro 1996 Website.

Zoreda et al., "Smart Cards", 1994, Artech House.

"Identification Card Systems—Inter–Sector Electronic Purse Part I: Concepts and Structures", 1994, European Standard, prEN 1546.

"Identification Card Systems—Inter–Sector Electronic Purse Part 2: Security Architecture", 1994, European Standard, prEN XXXXX–2.

"Identification Card System—Inter–Sector Electronic Purse Part 3: Data Elements and Interchanges", 1994, European Prestandard, prEN 1546–3.

"Identification Card System—Inter–Sector Electronic Purse Part 4: Devices", 1994, European Prestandard, prEN 1546–4.

"Identification Cards—Integrated Circuit(s) Cards With Contacts Part 1: Physical Characteristics", 1987, International Standard, ISO 7816–1, First Edition.

"Identification Cards—Integrated Circuit(s) Cards With Contacts Part 2: Dimensions and Location of the Contacts", 1988, International Standard, ISO 7816–2, First Edition.

"Identification Cards—Integrated Circuit(s) Cards With Contacts Part 3: Electronic Signals and Transmission Protocols", International Standard, ISO/IEC 7816–3, First Edition.

"Identification Cards—Integrated Circuit(s) Cards with Contacts Part 4: Inter–Industry Commands for Interchange", International Standard, ISO/IEC 7816–4, First Edition.

"Identification Cards—Integrated Circuit(s) Cards With Contacts Part 5: Numbering System and Registration Procedure for Application Identifiers", 1993, International Standard, ISO/IEC DIS 7816–5.

"International Cards—Integrated Circuit(s) Cards With Contacts Part 6: Inter–Industry Data Elements", 1995, International Standard, ISO/IEC DIS 7816–6.

"Bank Cards—Magnetic Stripe Data Content For Track 3", 1987, International Standard, ISO 4909 Second Edition.

"Identification Cards—Physical Characteristics", 1995, International Standard, ISO/IEC 7810, Second Edition.

"Identification Cards—Recording Technique—Part 1: Embossing", 1995, International Standard, ISO/IEC 7811–1, Second Edition.

"Identification Cars—Recording Technique—Part 2: Magnetic Strip", 1995, International Standard, ISO/IEC 7811–2, Second Edition.

"Identification Cards—Recording Technique—Part 3: Location of Embossed Characters on ID–1 Cards", 1995, International Standard, ISO/IEC 7811–5, Second Edition.

"Identification Cards—Recording Technique—Part 4: Location of Read–Only Magnetic Tracks—Tracks 1 & 2", 1995, International Standard, ISO/IEC 7811–4, Second Edition.

"Identification Cards—Recording Technique—Part 5: Location of Read–Write Magnetic Track—Track 3", International Standard, ISO/IEC 7811–5, Second Edition.

"Identification Cards—Recording Technique—Part 6: Magnetic Stripe–High Coercivity", 1996, International Standard, ISO/IEC 7811–6, First Edition.

"Identification Cards—Financial Transaction Cards", 1990, International Standard, ISO/IEC 7813, Third Edition.

"Identification Cards—Financial Transaction Cards Amendment 1" 1996, International Standard, ISO/IEC 7813, Fourth Edition.

"Identification Cards—Contactless Integrated Circuit(s) Cards—Part 1: Physical Characteristics", 1992, International Standard, ISO/IEC 10536–1, First Edition.

"Identification Cards—Contactless Integrated Circuit(s) Cards—Part 2: Dimensions and Location of Coupling Areas", 1995, International Standard, ISO/IEC 10536–2, First Edition.

"Identification Cards—Contactless Integrated Circuit(s) Cards—Part 3: Electronic Signals and Reset Procedures", 1996, International Standard, ISO/IEC 10536–3, First Edition.

"Financial Transaction Cards—Security Architecture of Financial Transaction System Using Integrated Circuit Cards—Part 1: Card Life Cycle", Sep. 15, 1991, International Standard, ISO/IEC 10202–1, First Edition.

Hiro Shogase, "The Very Smart Card: A Plastic Pocket Bank", IEEE Sepctrum, Oct. 1988.

* cited by examiner

Application Life Cycle

DELEGATED MANAGEMENT OF SMART CARD APPLICATIONS

This application claims priority of U.S. provisional patent application Nos. 60/105,841, 60/121,810 and 60/124,130 filed Oct. 27, 1998, Feb. 25, 1999 and Mar. 12, 1999 respectively, each entitled "Visa Open Platform Card Specification," which are hereby incorporated by reference.

This application is also related to U.S. patent application Ser. Nos. 09/046,993 and 09/046,994.

FIELD OF THE INVENTION

The present invention relates generally to smart cards. More specifically, the present invention relates to a technique for delegating the management of applications on a smart card such as loading, installation and deletion.

BACKGROUND OF THE INVENTION

Smart card technologies hold great promise as the replacement for magnetic stripe card technology. The adoption of smart cards, however, on a massive scale has been slow to develop. One reason for this slow adoption is the lack of standards among the many different vendor implementations of smart cards and the difficulties with implementing a new technology.

Recently, significant standards in the smart card area have been created. The standards, however, have been primarily targeted at either low levels of interoperability, such as the mechanical and electrical standards specified in the EMV specifications, or at the application layer in terms of developing standard chip credit, debit and purse applications. The main benefit of the standards has been realized in single-application smart cards, but has not significantly improved the situation for multi-applications smart cards.

The mid-1990s saw the introduction of various open systems standards for application development. For example, three technologies in this area are JAVA Card from Sun Microsystems, Inc., Smart Card for Windows from Microsoft Corporation, and MULTOS from MAOSCO, Ltd. These technology standards provide an important part of the solution toward common programming standards allowing application portability between different manufacturers card implementations. Other recent efforts have also addressed particular issues with multi-application smart cards. For example, U.S. patent application Ser. No. 09/046,994 filed Mar. 24, 1998, and U.S. patent application Ser. No. 09/046,993 filed Mar. 4, 1998 address issues related to post-issuance downloading and life cycle, each of which are hereby incorporated by reference.

In prior art smart cards only the issuer of the card has been allowed to perform certain management functions of applications such as loading an application onto the card, installing the application and deleting the application from the card. This reliance upon the issuer exclusively for loading, installing and deleting applications can lead to some difficulties. For example, should a store develop a loyalty application for its customers that it wishes to load and install onto their customer's smart cards, the store would be precluded from doing so if only the card issuer is allowed to perform such functions. Arranging for the store to contact the issuer, and arranging for the issuer to load the store's application onto its customer's smart cards presents basic logistical problems such as application security and access to cards. For example, it would be best if the store could download an application onto a customer card while the customer visited the store. If only the issuer can download the application, it becomes more difficult to access the customer card.

In addition to logistical problems, there are privacy issues with regard to an application developer's private customer data. For example, if a loyalty application of a particular third party is loaded onto a smart card by the issuer, it may be still necessary to add private customer-specific data onto each individual card for use by loyalty application. This private customer information may very well be the private property of the third party, and the third party may be unwilling to transfer this private information to a card issuer to allow the card issuer to load and install the third party's loyalty data. For instance, Hertz would likely be unwilling to provide private customer information regarding it top renters to the bank that is loading Hertz's application onto a smart card.

Other mechanical difficulties are presented should a customer desire to download and install a third party's application at the third party's site if only the issuer is allowed to download and install an application. For example, should a customer wish to download a loyalty application while at the third party's place of business during a smart card transaction, it would be first be necessary for the card acceptance device to connect to the issuer host to download the loyalty application, and then connect to the third party's host computer in order to receive custom information for the initialization and personalization of that application. Such multiple connections at load time make the transaction more complex, time consuming and are more prone to failure. In addition, as a practical matter, should a customer wish to download and install an application onto his smart card, it is more than likely that the customer is physically present at a third party site rather than at the issuer's site.

Further difficulties may be encountered if only the issuer is allowed to delete an application that belongs to the application provider/developer from a customer smart card. For example, the application is the responsibility of the application provider and is his liability. Should an agreement expire between the provider and the issuer, it may be more desirable for the provider to be able to delete his property (the application) from the smart card, rather than relying upon the issuer to do so for him. A further difficulty encountered if only the issuer is allowed to delete an application relates to the application data. When an application is deleted, the application data is deleted as well. Therefore, it would be desirable to allow the application provider to extract any relevant data (e.g., loyalty points from a loyalty application) from the card before the application is deleted. Since the card issuer does not have the provider's application keys, it would be near impossible for the card issuer to extract any information that required any kind of authentication. (The provider may also not desire that the issuer have access to the extracted information.)

Therefore, it would be desirable to allow another entity besides the card issuer to manage various functions associated with card applications such as loading, installing and deleting. It would further be desirable to allow the issuer to still be able to manage and control which applications are present on the smart card.

SUMMARY OF THE INVENTION

To achieve the foregoing, and in accordance with the purpose of the present invention, a technique is disclosed that extends the functionality of a security domain and allows it to perform delegated management of smart card applications. For example, embodiments of the present invention allow a security domain to perform delegated loading, installation and/or deletion of an application. By delegating this management to their security domain, a provider of an application is assured of more direct control and management of their application, yet an issuer still maintains some control over the management of the card.

This concept of delegated management allows the card issuer the option of empowering application providers to initiate changes to the issuer's smart cards that are pre-approved by the card issuer. This pre-approval ensures that only card content changes that the card issuer has approved will be accepted and processed by a card manager of a smart card. This delegation of control in the card update process allows application providers more flexibility in managing their own applications on the card issuer's cards.

In one embodiment, a method of delegated loading of an application onto a smart card first receives a load command from an application provider via a card acceptance device. The load command includes an indication of an application to be loaded and an appended command authentication pattern. Next, the load command is verified using the command authentication pattern. Then, an application is received from an application provider via the card acceptance device; the application also includes an appended application authentication pattern which is used to verify the application. Finally, the application is loaded into memory of the smart card. Thus, an application provider is allowed to load an application onto a smart card.

In another embodiment, a system for delegated loading of an application onto a smart card includes a host computer under control of an application provider and a software application to be loaded onto a smart card. The application includes an appended application authentication pattern produced by an issuer of the smart card that verifies the application to the smart card. The system also includes a smart card acceptance device linked to the host computer and a smart card included in the card acceptance device. The smart card includes code arranged to verify the application using the application authentication pattern. Thus, the application provider is allowed to load the application onto the smart card.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

Figure 1:
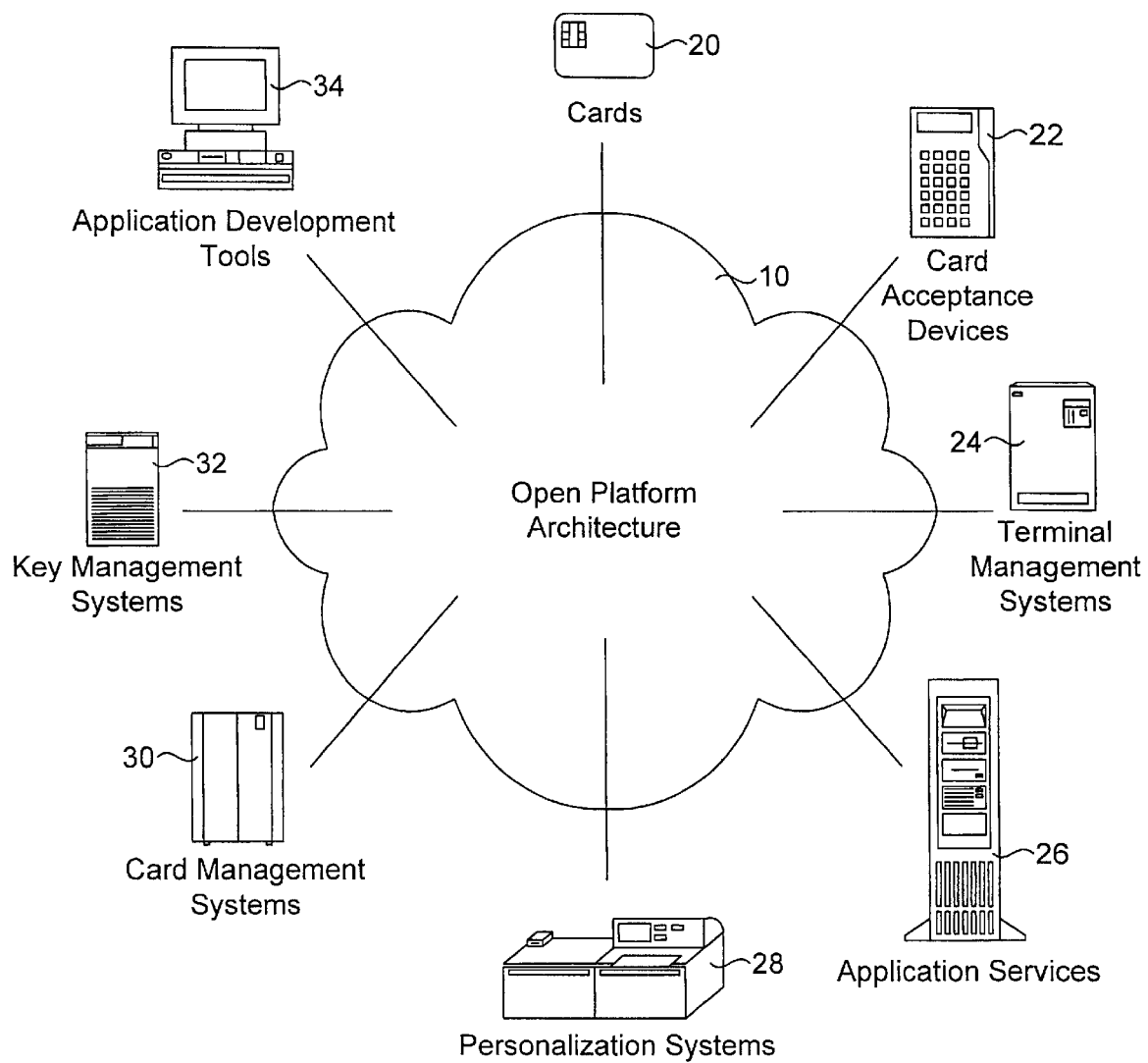
FIG. 1 illustrates symbolically and environment in which the Open Platform architecture provides benefits for smart card holders, issuers, application developers and other entities.

The present invention is suitable for use with either single or multi-application smart cards. A multi-application smart card may come from a variety of manufacturers and may use any of a number of operating systems. By way of example, a smart card may use the JAVA Card operating system or the Smart Card for Windows operating system. As used herein, "smart card" refers to any of these single-application or multi-application smart cards. In one particular embodiment, the present invention works well with the "Open Platform" architecture as defined in *Open Platform Card Specification Version* 2.0, Apr. 19, 1999, available from Visa International Service Association. This architecture in one embodiment is based upon the JAVA Card operating system and provides a hardware-neutral, vendor-neutral, application-independent card management standard. The standard provides a common security and card management architecture and defines a flexible and powerful standard for card issuers to create multi-application smart cards.

Smart Cards

The present invention is applicable to smart cards. Also termed chip cards, integrated circuit cards, memory cards or processor cards, a smart card is typically a credit card-sized plastic card that includes one or more semiconductor integrated circuits. A smart card can interface with a point-of-sale terminal, an ATM, or with a card reader integrated with a computer, telephone, vending machine, or a variety of other devices. The smart card may be programmed with various types of functionality such as a stored-value application, a credit or debit application, a loyalty application, cardholder information, etc. Although a plastic card is currently the medium of choice for smart cards, it is contemplated that a smart card may also be implemented in a smaller form factor, for example, it may attach to a key chain or be as small as a chip module. A smart card may also be implemented as part of a personal digital assistant, telephone (such as a subscriber identification module), or take a different form. The below description provides an example of the possible elements of a smart card, although the present invention is applicable to a wide range of types of smart cards.

A smart card may include a microprocessor, random access memory (RAM), read-only memory (ROM), non-volatile memory, an encryption module (or arithmetic unit), and a card reader (or terminal) interface. Other features may be present such as optical storage, flash EEPROM, FRAM, a clock, a random number generator, interrupt control, control logic, a charge pump, power connections, and interface contacts that allow the card to communicate with the outside world. Of course, a smart card may be implemented in many ways, and need not necessarily include a microprocessor or other features.

The microprocessor is any suitable central processing unit for executing commands and controlling the device. RAM serves as temporary storage for calculated results and as stack memory. ROM stores the operating system, fixed data, standard routines, look up tables and other permanent information. Non-volatile memory (such as EPROM or EEPROM) serves to store information that must not be lost when the card is disconnected from a power source, and must also be alterable to accommodate data specific to individual cards or changes possible over the card lifetime. This information includes a card identification number, a personal identification number, authorization levels, cash balances, credit limits, and other information that may need to change over time. An encryption module is an optional hardware module used for performing a variety of encryption algorithms. Of course, encryption may also be performed in software. *Applied Cryptography*, Bruce Schneier, John Wiley & Sons, Inc., 1996 discusses suitable encryption algorithms and is hereby incorporated by reference.

The card reader interface includes the software and hardware necessary for communication with the outside world. A wide variety of interfaces are possible. By way of example, the interface may provide a contact interface, a close-coupled interface, a remote-coupled interface, or a variety of other interfaces. With a contact interface, signals from the integrated circuit are routed to a number of metal contacts on the outside of the card which come in physical contact with similar contacts of a card reader device. A smart card may include a traditional magnetic stripe to provide compatibility with traditional card reader devices and applications, and may also provide a copy of the magnetic stripe information within the integrated circuit itself for compatibility.

Various mechanical and electrical characteristics of a smart card and aspects of its interaction with a card reader device are described in *Smart Card Handbook*, W. Rankl and W. Effing, John Wiley & Sons, Ltd., 1997, and are defined by the following specifications, all of which are incorporated herein by reference: *Visa Integrated Circuit Card Specification*, Visa International Service Association, 1996; *EMV Integrated Circuit Card Specification for Payment Systems, EMV Integrated Circuit Card Terminal Specification for Payment Systems, EMV Integrated Circuit Card Application Specification for Payment Systems*, Visa International, Mastercard, Europay, 1996; and *International Standard; Identification Cards— Integrated Circuit(s) Cards with Contacts, Parts* 1–6, International Organization for Standardization, 1987–1995.

Card Architecture

FIG. 1 illustrates symbolically an environment in which Open Platform architecture 10 provides benefits for smart card holders, issuers, application developers and other entities. Although the present invention works well within architecture 10, it is also suitable for use in other architectures. Open Platform architecture 10 embodied within a smart card 20 provides card issuers an architecture for managing smart cards. Architecture 10 gives card issuers the power to manage and change the content of their cards while also offering them the flexibility to share control of their cards with other business entities. Preferable, ultimate control rests with the card issuer, but through use of architecture 10 other business entities are allowed to manage their own applications on the card issuers cards as appropriate. An issuer personalizes new cards received from a card supplier and then issues these cards to customers. Personalization may also be performed by the card supplier or by a personalization bureau. An issuer may be any suitable issuing entity such as a bank, financial institution, telecommunications network operator, a service association, a merchant or other organization, or even an agent acting for an issuer.

As shown symbolically, in FIG. 1 a wide variety of systems and devices benefit through use of architecture 10. A smart card 20 has been previously described and its relationship with architecture 10 will be further explained below. A card acceptance device 22 (also termed card reader or terminal) may contain an application that interacts with architecture 10 within smart card 20, and can also download an application onto the smart card. A terminal management system 24 manages terminals and their respective applications. An application server 26 provides an application for a smart card or card reader. A personalization system 28 personalizes smart card applications. A card management system 30 manages an issuer's card base and respective applications. A key management system 32 provides support for pre-issuance and post-issuance support for key generation and/or key storage and/or key retrieval. Application development tools 34 are used to develop smart card applications.

Figure 2:
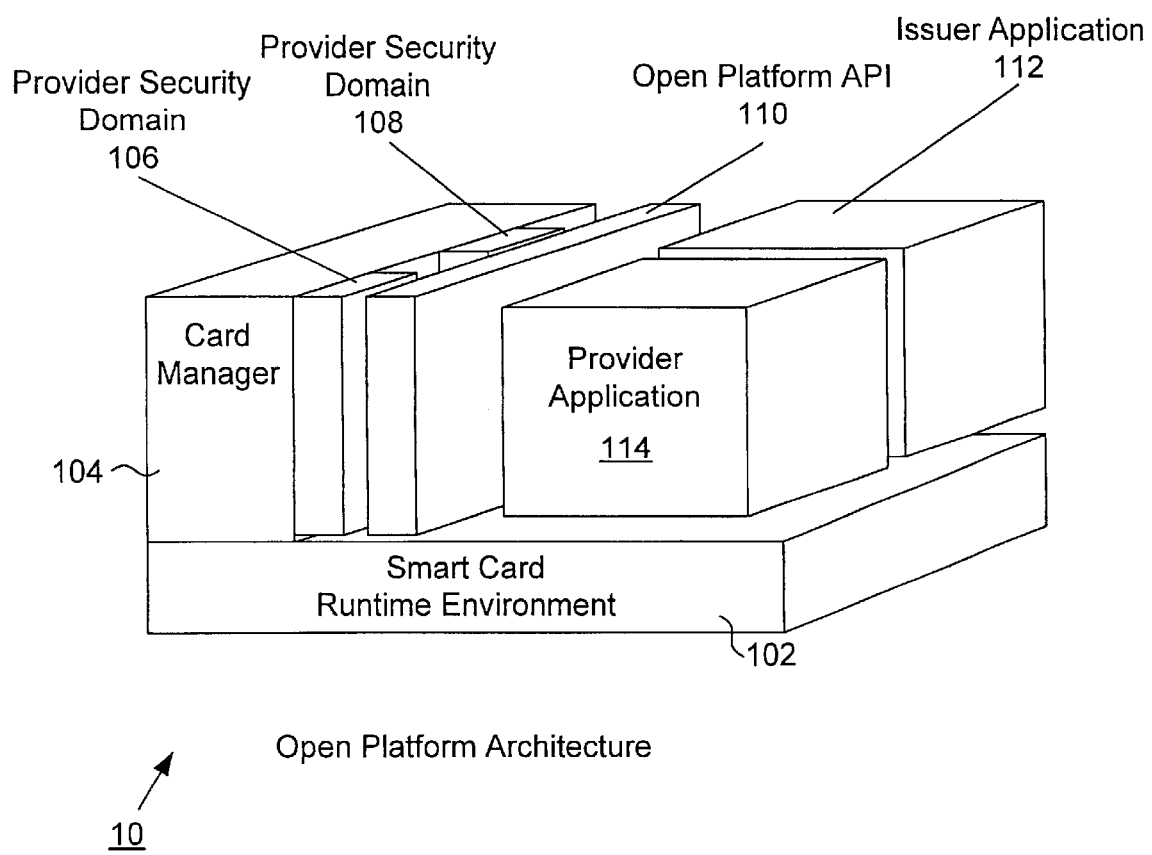
FIG. 2 illustrates in further detail the Open Platform architecture as it may be implemented upon a smart card.

FIG. 2 illustrates in further detail Open Platform architecture 10 as it may be implemented upon a smart card (not shown). Run-time environment 102 includes both the actual hardware of the smart card as well as the operating system of the smart card. Architecture 10 may be implemented on top of any card run-time environment. Run-time environment 102 is responsible for providing a hardware independent application programming interface (API) for provider applications as well as a secure storable and executing space for applications, thus ensuring that each application's code and data are able to remain separate and secure from others. Architecture 10 may be used with any of a wide variety of physical smart cards available from a wide variety of manufacturers. Further, architecture 10 may be implemented on top of any suitable smart card operating system, such as JAVA Card and Smart Card for Windows, among others.

Architecture 10 includes a number of components as shown in the sample card configuration of FIG. 2. Card manager 104 is a software application that represents the card issuer. It manages the run-time environment for applications and controls the overall system and security for the smart card. Card manager 104 provides an Open Platform API 110 for applications to access its services and an external command interface for management of the card by off-card management systems. In one embodiment of the invention, this external command interface is an Application Protocol Data Unit (APDU) interface which is an ISO standard communication messaging protocol between a card acceptance device and its smart card. Further details on the APDU interface are contained in *Open Platform Card Specification Version* 2.0 referenced above. Other external command interfaces such as RPC or RMI may also be suitable. Additionally, card manager 104 loads issuer application 112 and performs related card content management on behalf of the card issuer while also managing the loading, installation and deletion of applications provided by application providers.

Card manager 104 also performs APDU command dispatching and application section. Card manager 104 includes an internal card registry 250 as an information resource for card management. The card registry contains information for managing card, load file and application life cycle states, card blocking, personal identification numbers (PINs), application loading, installation and deletion, and the authorization of memory allocation.

Card manager 104 can also function as an application. It has application characteristics such as an application identifier (AID), application life cycle states, and it can select itself as the selected application. For example, card manager 104 functions as an application when the card issuer selects the card manager to load a new application onto a new card.

Card manager 104 is responsible for overall card security and includes the security domain application of the card issuer which supports key handling, encryption, decryption, signature generation and verification for the card issuer's applications. Card manager 104 may include a variety of cryptographic keys for the smart card to perform these functions. In a preferred embodiment of the invention, it includes at least one set of static symmetric keys including an authentication/encryption key, a MAC creation key, and a key encryption key. The authentication/encryption key is used for the initial mutual authentication of card and host and for data encryption during regular session processing. The MAC creation key is used to calculate data authentication patterns for (a) verifying the integrity of data in a command data field and (b) verifying the authenticity of a command. The key encryption key is used to decrypt keys that are received by the card. Most preferably, a session key may be derived from any of the above keys using unique card data and session data. In addition to the symmetric key set, the card manager may make use of a asymmetric cryptography by also including the public key of an issuer for decrypting information that has been originally been encrypted using the private key of the issuer.

Provider security domains 106 and 108 are special key and security management applications that are used to ensure separation of keys between the card issuer and different application providers. For example, security domain 106 includes keys for provider application 114 that are not revealed to card manager 104, issuer application 112 or other entities on the card. Security domain 108 contains keys unique to another provider application. In this fashion, a security domain is the on-card representative of an application provider. It provides cryptographic services for all the applications on a card that are owned by a particular application provider. Alternatively, there may be one security domain for each application on a card. A security domain may be established on behalf of an application provider when the provider requires use of keys on the card which should be kept secret from card issuer keys and other provider keys. The issuer's security domain which includes the issuer's secret keys are preferably included within card manager 104.

Open Platform API 110 provides an interface that provides access to services provided by card manager 104 and security domains 106 and 108 for various applications. Open Platform API 110 may be implemented in any suitable language and in one embodiment uses the JAVA programming language.

Issuer application 112 is an issuer-provided software application that performs any suitable function on the smart card desired by the issuer. In one embodiment, issuer application 112 may perform the functions of home banking or card content auditing, for example.

Provider application 114 is any suitable software application provided for a smart card by a business entity known as a provider. Applications can generally by classified as non-changeable applications that are loaded into ROM during the manufacturing stage and are not altered during the lifetime of the card, and changeable applications that can be loaded, installed or removed during initialization or post-issuance. Some applications may have components that reside in both immutable memory such as ROM and in mutable memory such as EEPROM. The present invention is suitable for use for any of a wide variety of types of provider applications. These types of applications include: loyalty applications, stored value applications, credit/debit applications, transit, health care, insurance, electronic ticketing, electronic hotel check-in, and coupon applications.

Figure 3:
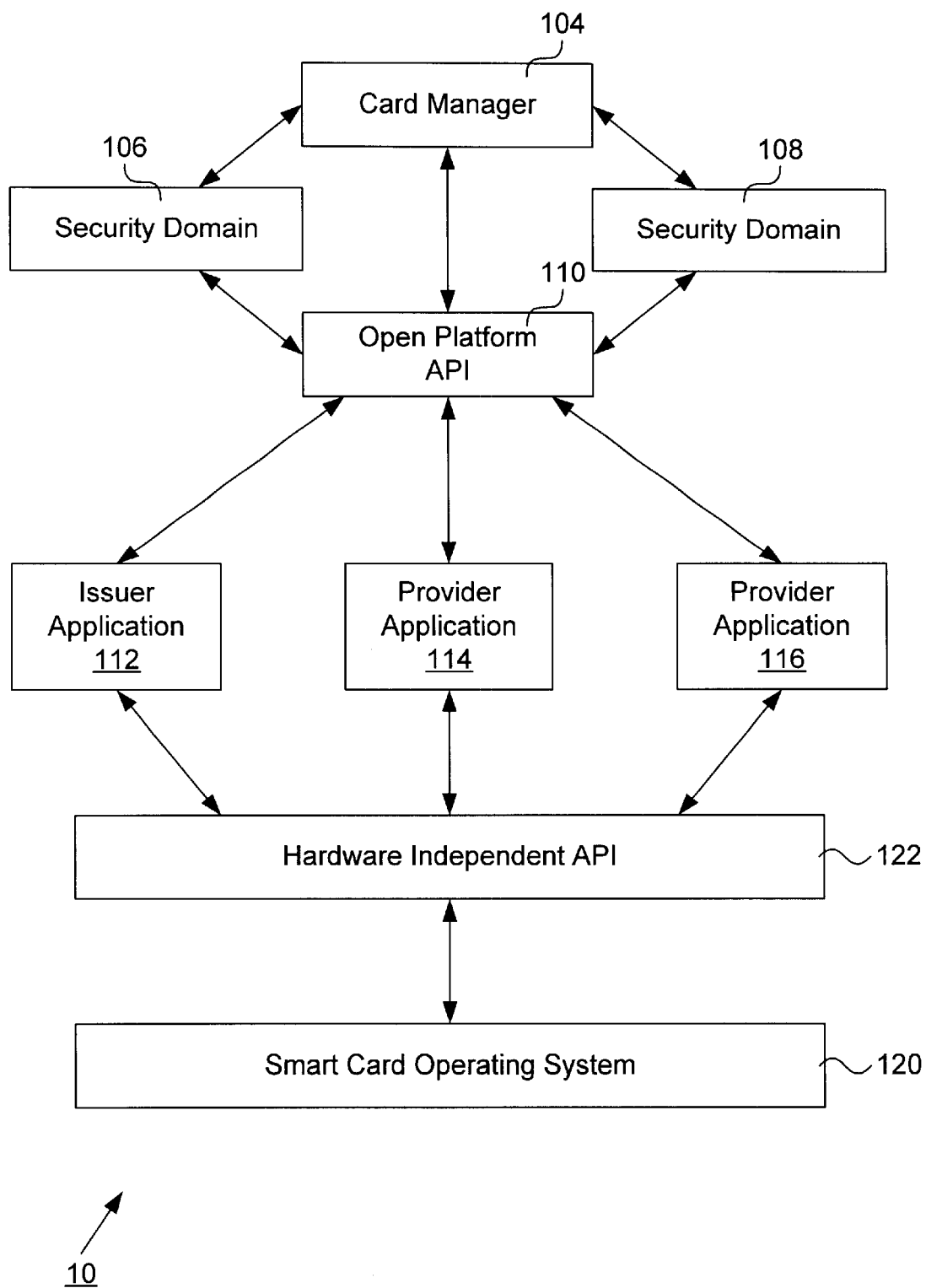
FIG. 3 is another illustration of the Open Platform architecture of FIG. 2 suitable for explaining the present invention.

FIG. 3 is another illustration of the Open Platform architecture 10 of FIG. 2 suitable for explaining the present invention. As mentioned earlier, smart card operating system 120 is any hardware dependent operating system for a particular smart card. Hardware independent API 122 is in communication with operating system 120 and provides a consistent API for smart card applications 112–116. API 122 may be implemented using JAVA Card, Smart Card for Windows, and others. In general, APIs may be implemented using interpretative approaches (JAVA, BASIC, FORTH, etc.), compiled high level languages ("C") or native assembly coding.

Applications 112–116 are present on the smart card and communicate directly with API 122 to perform functions on the smart card. In addition, applications 112–116 use Open Platform API 110 to access the unique system services provided by card manager 104 and any available security domains. As mentioned above, these services to the Open Platform architecture include application state tracking, personalization support, card security management, etc. Security domains 106 and 108 also communicate with card manager 104.

Life Cycles and Card Registry

Figure 4:
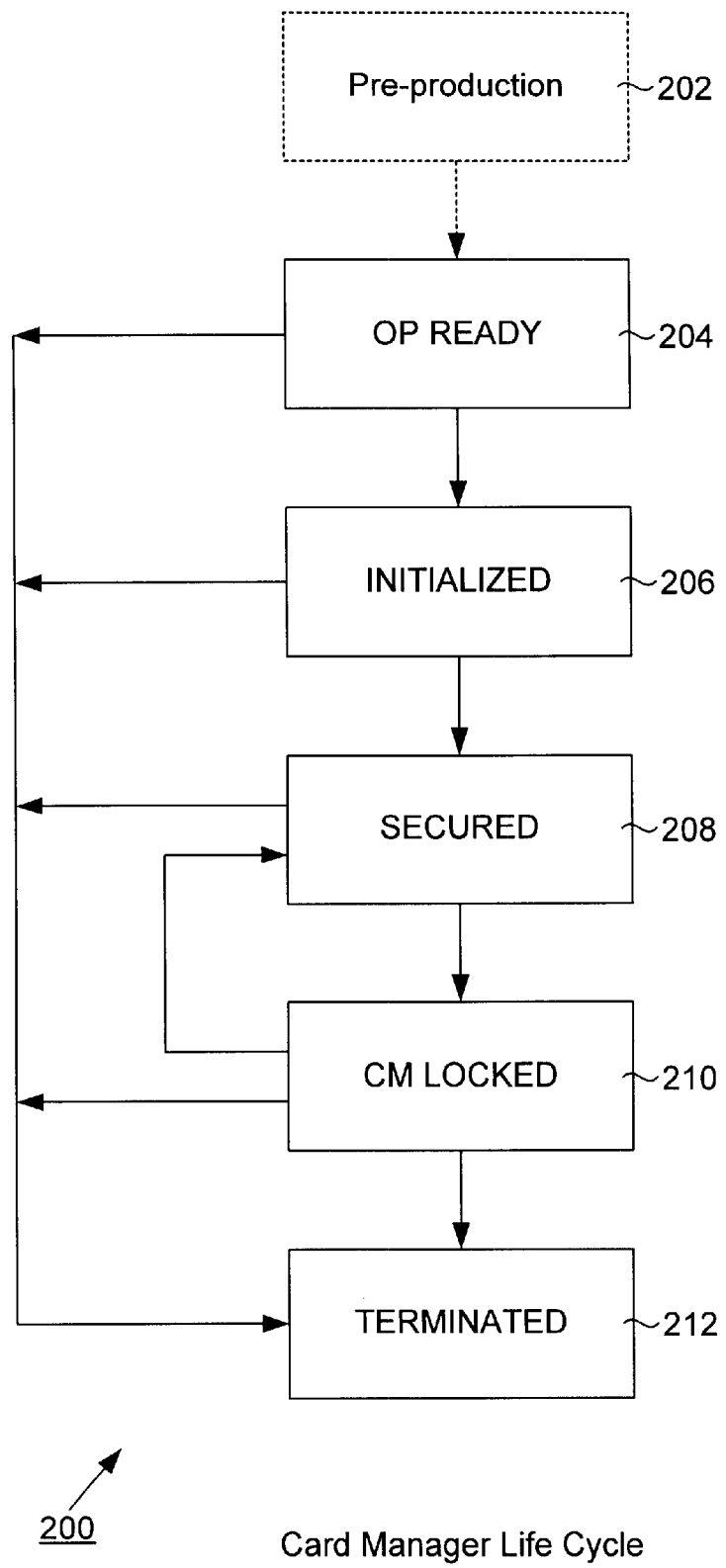
FIG. 4 illustrates the card manager life cycle state transitions according to one embodiment of the invention.

FIG. 4 illustrates the card manager life cycle state transitions 200 according to one embodiment of the invention. This life cycle is illustrative of possible states and transitions that work well with the present invention. Other life cycle states for the card manager and different transitions are also possible. As card manager 104 performs a supervisory role over the entire smart card, its life cycle can be thought of as being similar to the life cycle of the smart card. Card manager 104 owns and maintains the life cycle state information and manages requested state transitions in response to external commands (such as APDU commands).

Pre-production state 202 refers to all smart card activities prior to the initial life cycle state of card manager 104. These activities include mounting a chip onto the smart card, loading an operating system onto the card, etc., and are specific to the manufacturer of the card. A wide variety of other activities may occur during pre-production state 202 depending upon the card manufacturer, the type of card and the issuer.

In general, Open Platform (OP) Ready state 204 and Initialized state 206 are intended for use during the pre-issuance phase of the smart card. States Secured 208, Locked 210, and Terminated 212 are intended to be used during the post-issuance phase of the smart card.

In Ready state 204 all of the basic functionality of run-time environment 102 is available and card manager 104, acting as the default application, is ready to receive, execute and respond to external APDU commands. In the Ready state any files loaded into ROM are available, runtime environment 102 is ready for execution, card manager 104 acts as the default application, and an initialization key is available within the card manager 104. During this state, security domains and their key sets may be loaded, applications from ROM may be installed, and applications may be loaded into EEPROM.

The Initialized State 206 is an administrative card production state. Its definition is manufacturer and/or implementation dependent and may have a wide variety of definitions.

The state Secured 208 is the normal operating state for the smart card after issuance. This state indicates that card manager 104 should enforce the issuer's security policies for post-issuance behavior such as application loading and activation. These security policies may vary by card depending upon the specific requirements of each card issuer. Preferably, when an issuer determines that a card is ready to be issued to a cardholder, the issuer irreversibly sets the state of the card to Secured. In one embodiment, the card has the following functionality in this state: the card manager contains its necessary key sets and security elements; issuer initiated card content changes can be carried out through the card manager; post-issuance personalization of applications belonging to the issuer can also be carried out by the card manager; security domains contain their necessary key sets and security elements; provider initiated card content changes can be carried out by security domains that have the delegated management privilege; and post-issuance personalization of applications belonging to a provider can be carried out via a security domain.

Card Manager (CM) Locked state 210 is used to tell card manager 104 to temporarily disable all applications on the card except for the card manager. This state provides the issuer with the ability to detect security threats either internal or external to the card and to be able to temporarily disable the functionality of the card. While in this state, the card will no longer function except via card manager 104 which is controlled by the issuer. While in this state, there is an option to determine that the threat is either no longer present or is of limited severity such that the issuer can reset the card to the normal operating state of Secured.

Card manager 104 is set to the state Terminated 212 to permanently disable all card functionality including card manager 104. This state allows the issuer to logically destroy the card if there is a severe security threat or if the card has expired. Preferably, the Terminated state is irreversible and indicates the end of the smart card life cycle.

Figure 5:
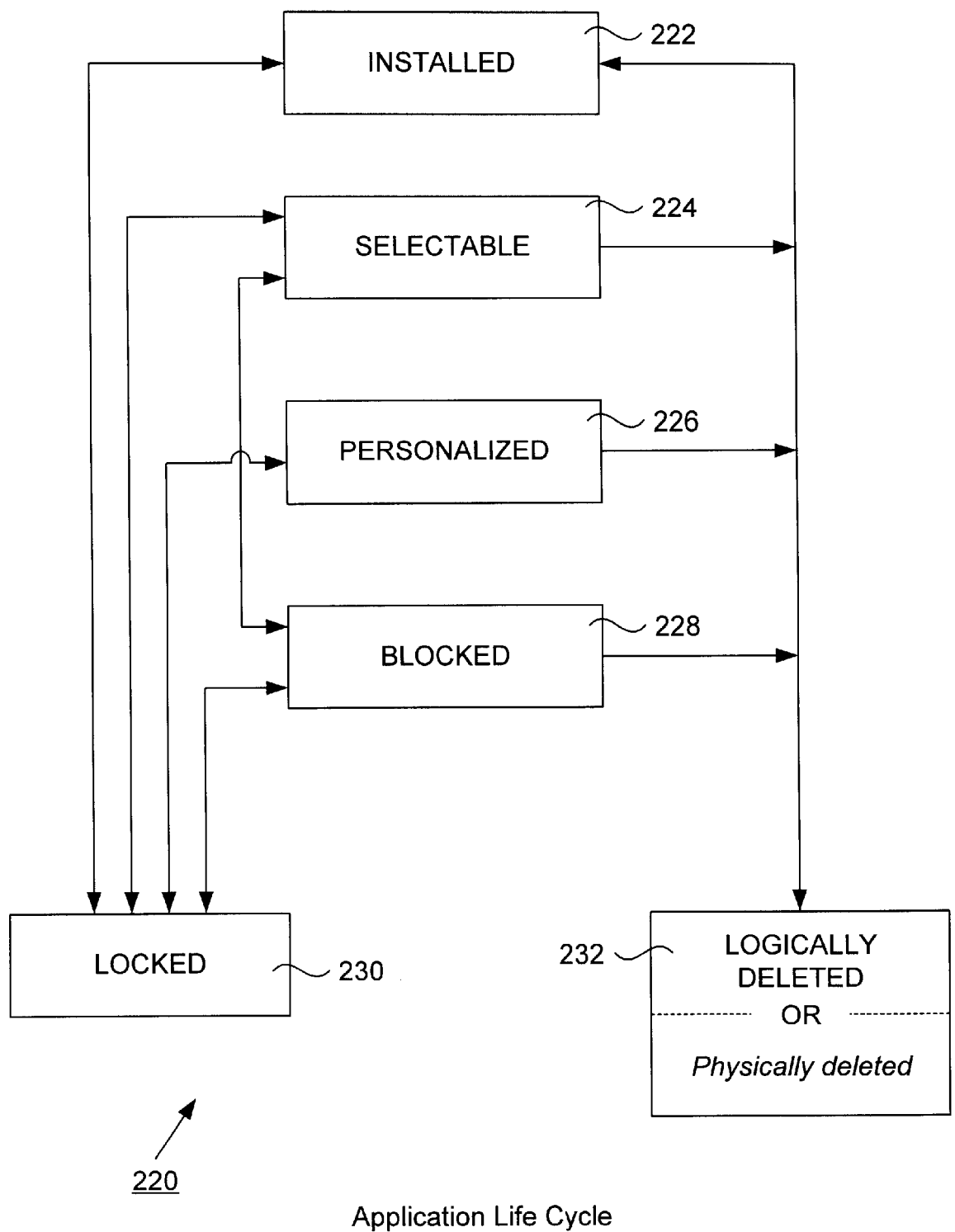
FIG. 5 illustrates application life cycle state transitions according to one embodiment of the invention.

FIG. 5 illustrates application life cycle state transitions 220 according to one embodiment of the invention. The application life cycle begins when an application is installed on a smart card. Installation may occur directly during loading or via another file present on the card. Card manager 104 is responsible for managing the initial life cycle state transition of an application before it is fully functional. Once an application is available for selection from the outside world, it takes control of managing its own life cycle. These life cycle states are used to inform card manager 104 of the status of the application. The definition of these states are application dependent and are preferably known only to the application. Card manager 104 can take control of the application life cycle if the card or the issuer detects a security problem or if the application is to be deleted.

The Installed State 222 means the application executable has been properly linked and any necessary memory allocation has taken place so that the application may execute. The installation process does not include establishing the application as an externally visible application (the Selectable State), also, installation is not intended to personalize the application. Preferably, card manager 104 sets the life cycle of an application to the state Installed during the application installation process.

The state Selectable 224 is used to make an application available to receive external commands (such as APDU commands) from outside the card. Card manager 104 is responsible for making an application available for selection by setting its life cycle state to Selectable. Preferably, applications are properly installed and functional before they can be set to the state of selectable.

Transition to the Personalized state 226 is application dependent: preferably this state indicates that the application has all of the necessary personalization data and keys for full run-time functionality. The behavior of the application while in this state is determined by the application itself, and preferably card manager 104 is not involved. Also, the application manages its life cycle transition from the state Selectable to the state Personalized.

The definition of what is required for an application to transition to the state Blocked 228 is application dependent. Preferably, a transition to this state indicates that an application specific security problem has been detected either from within the application or from outside the card. Preferably, the behavior of the application while in this state is determined by the application itself and card manager 104 need not be involved. At any point in the application life cycle, card manager 104 may take control for security reasons and set the application life cycle state to Locked 230. Card manager 104 or an issuer uses the state Locked as a security management control to prevent the selection and execution of an application. The card manager may set an application to Locked if it detects a threat from within the card that appears to be associated with a particular application. Alternatively, an issuer may determine that a particular application needs to be locked for a business or security reason and initiate the transition to the Locked State via the card manager. Once an application is set to Locked, only the card manager may transition the application back to the state that it held just prior to being placed in the Locked State.

If an application is to be removed from the card either logically or physically, the card manager manages that process and then sets the life cycle state to Deleted 232. The request to delete an application may come from the application itself, its associated security domain, the card manager or an issuer. If the card manager receives a request to delete an application which cannot be physically deleted (e.g., because it is stored in ROM), the application may be logically deleted by setting its state to Logically Deleted. Once an application is in the state Logically Deleted, it cannot be reversed. The card manager considers this state to be the equivalent of physical deletion of the application.

Preferably, a security domain also follows the above application life cycle. A security domain may have specific run-time behavior that is different from a regular application. Security domains are installed on the card by the card manager, which sets their state to Installed. A security domain is not available for selection while in this state. The card manager sets a security domain to the state Selectable in order to enable personalization. Once a security domain has been personalized with its keys and other necessary security elements, it sets its state to Personalized. A security domain has the option to block itself as a protection mechanism against a threat. Preferably, blocking a security domain does not have a required effect on access to that security domain by an application via Open Platform API 110. Security domains do, however, have the option to implement their own specific behavior while in the Blocked State.

As with any other application, the card manager may set a security domain to the state Locked and that domain may no longer be available for selection. Locking a security domain, however, does not have any effect on the access of that domain by applications via Open Platform API 110. A Locked security domain preferably is only unlocked via a command from the card manager.

Figure 6:
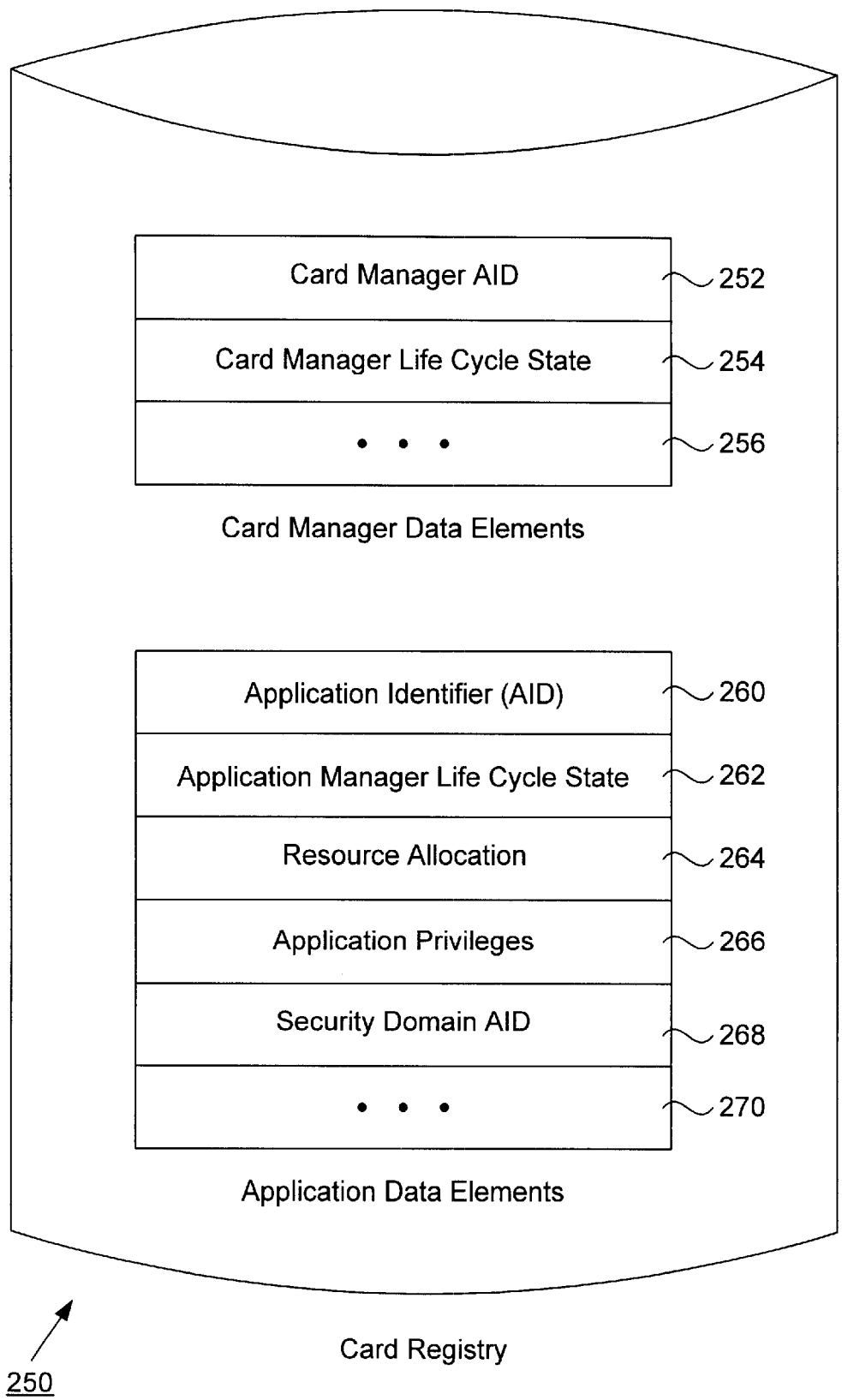
FIG. 6 illustrate a card registry database according to one embodiment of the invention.

FIG. 6 illustrates a card registry database 250 according to one embodiment of the invention. Card registry 250 is persistent data storage on a smart card that supports various functions of card manager 104 and may be implemented using any suitable medium and protocol. In one embodiment card registry 250 supports the functions of command dispatch, card content management, security management and the issuer's security domain in the card manager.

Preferably, registry 250 includes one set of card manager data elements and a separate set of application data elements for each application on the card including security domains. Card manager AID 252 is a unique identifier for the card manager and is used in a Select command intended for the card manager. Card manager life cycle state 254 contains the current life cycle state of the card manager. Other data elements 256 may also be present.

Application identifier 260 is a unique identifier for each application on the card and is used by the card manager for application selection. Application life cycle state 262 contains the current life cycle state of the application or security domain. Resource allocation 264 is a data element that contains a value for the total amount of resources that are available to an application. It is an application specific value and is used as a control mechanism by the card manager to limit the amount of resources that an application uses during run time. When additional resources are requested by an application. The card manager compares against this data element. Application privileges 266 are a set of data elements that indicate privileges for each application. A variety of privileges may be indicated for an application: the application is a security domain without delegated management privilege; the application is a security domain with data authentication pattern privileges; the application is a security domain with delegated management privilege; the application has card manager locking privilege; the application has card termination privilege; the application is the default selected application; and the application has privilege to change a card global PIN. Each privilege may be marked as true or false, and an application may have more then one privilege marked as true. The card manager may apply a set of rules to these privileges for management of the card in any suitable fashion.

Security Domain AID 268 is a data element that contains the AID of an application's corresponding security domain. When an application provider requests a connection to its security domain, the card manager uses this data element to return a reference to this appropriate domain. The card manager acts as the security domain for card issuer applications if no other applicable security domain is present on the card. Other data elements 270 may also be present.

Delegated Loading and Installation of an application

The present invention provides a technique to extend the functionality of a security domain and to allow it to perform delegated management of smart card applications. For example, the present invention allows a security domain to perform delegated loading, installation and/or deletion of an application. By delegating this management to their security domain, a provider of an application is assured of more direct control and management of their application, yet an issuer still maintains some control over the management of the card.

The Open Platform architecture allows parties other than the card issuer such as application providers to load, install, and delete their own applications. In general, these processes are referred to as delegated management. In general it is desirable that a card issuer have complete control over the smart cards it issues. The card issuer, however, may not necessarily wish to manage all card content changes, especially when the content does not belong to the card issuer but to an application provider. This concept of delegated management is incorporated into the Open Platform architecture to allow the card issuer the option of empowering application providers to initiate changes to the issuer's smart cards that are pre-approved by the card issuer.

This pre-approval ensures that only card content changes that the card issuer has approved will be accepted and processed by card manager 104 of a smart card. This delegation of control in the card update process allows application providers more flexibility in managing their own applications on the card issuer's cards.

Delegated loading allows the application provider to establish a loading session for transferring their application files directly to their own security domains. Once each APDU command has been securely transferred onto the card, the security domain passes it to the card manager for loading into persistent memory. The card manager is able to identify the authenticity of these processes through the use of a data authentication pattern applied to the install commands and the load file itself. The card manager does not verify the data authentication patterns applied to individual Load commands. The command related DAPs which the card manager does check are referred to as the Load and Install tokens.

In addition to these DAPs which are intended for the card manager, the application provider applies DAPs (which cover the command and tickets) for securing (integrity) the transport of all commands (Install and Load) to a security domain. Using this terminology, a token is a DAP intended for the card manager, which is distinct from the DAPs that are applied and intended for a security domain.

The card issuer pre-authorizes the initial install command (which performs loading) and the load file through the use of these data authentication patterns. The data authentication pattern for the application file is included in the initial Install command to ensure that application which has been approved by the card issuer is the same application that is subsequently received by the card manager through the series of loading commands that follow the first install command.

A delegated installation process is used to install an application that is already present in the card. The card issuer pre-authorizes a second install command that includes the application installation information. Once again a data authentication pattern is appended to this command to ensure its authenticity. Once the card manager has validated the install command and carried out instructed operations, the card manager may generate a response to return to the security domain. Completion of a delegated load results in the generation of a load receipt while completion of a delegated installation results in the generation of an install receipt. The processes in the delegated loading and delegated installation may occur in a single transaction where an application is loaded and installed immediately. Alternatively, the delegated loading and installation processes may occur independently of one another. Preferably for delegated loading and installation, the card manager is in the life cycle state Secured, the security domain to be used is in the state Personalized, and the security domain has the delegated management privilege.

A security domain may be loaded onto a smart card and be provided with cryptographic keys in a wide variety of manners. One difficulty with the prior art is that if a security domain or other application were loaded onto a card post-issuance, is that it would rely upon keys on the card that were known to an issuer or another provider. This reliance upon an issuer or other provider for the loading of a security domain might compromise the secret keys within that domain; a provider would wish that those keys were kept separate and secret from an issuer or other provider. Two techniques have been used to provide a security domain on a card having secret keys that do not become known to an issuer or other provider. In one example, any number of security domains with their included secret keys are installed onto the smart card by a manufacturer when the card is produced. These domains are known only to the manufacturer. When the card is released to an issuer, the manufacturer may release certain sets of the keys to the issuer while keeping secret key sets pertaining to various other of the security domains. These retained key sets are either held by the manufacturer, put in escrow or given to a trusted third party. Later in the life of a card when a new application provider wishes to take ownership of a security domain on the card and use it to load an application, this provider receives a secret key set for one of the unassigned security domains from the trusted third party. In this way, the key set for a security domain is known only to the new application provider and is kept separate from the issuer or another application provider.

In another example of how a security domain and its secret keys may be assigned to a provider, a technique as described in U.S. patent application Ser. No. 09/046,993 may be used. In this scenario, one of the security domains on the card is assigned to a trusted third party. The trusted third party takes ownership of the domain and control of its secret keys. Once the card is issued and is in use by a cardholder, the trusted third party retains ownership of the security domain. A new application provider that wishes to load an application onto the card would then approach the trusted third party for permission to use their security domain. The application provider would then load their own application (which might be a new security domain) using the security domain and secret keys of the trusted third party. In this fashion, a new application provider is allowed to load a new application and security keys without having to share the same with an issuer or another application provider. These techniques and others may be used to provide a security domain on a smart card having a security key set that is known to the application provider to whom the security domain belongs.

Figure 7A:
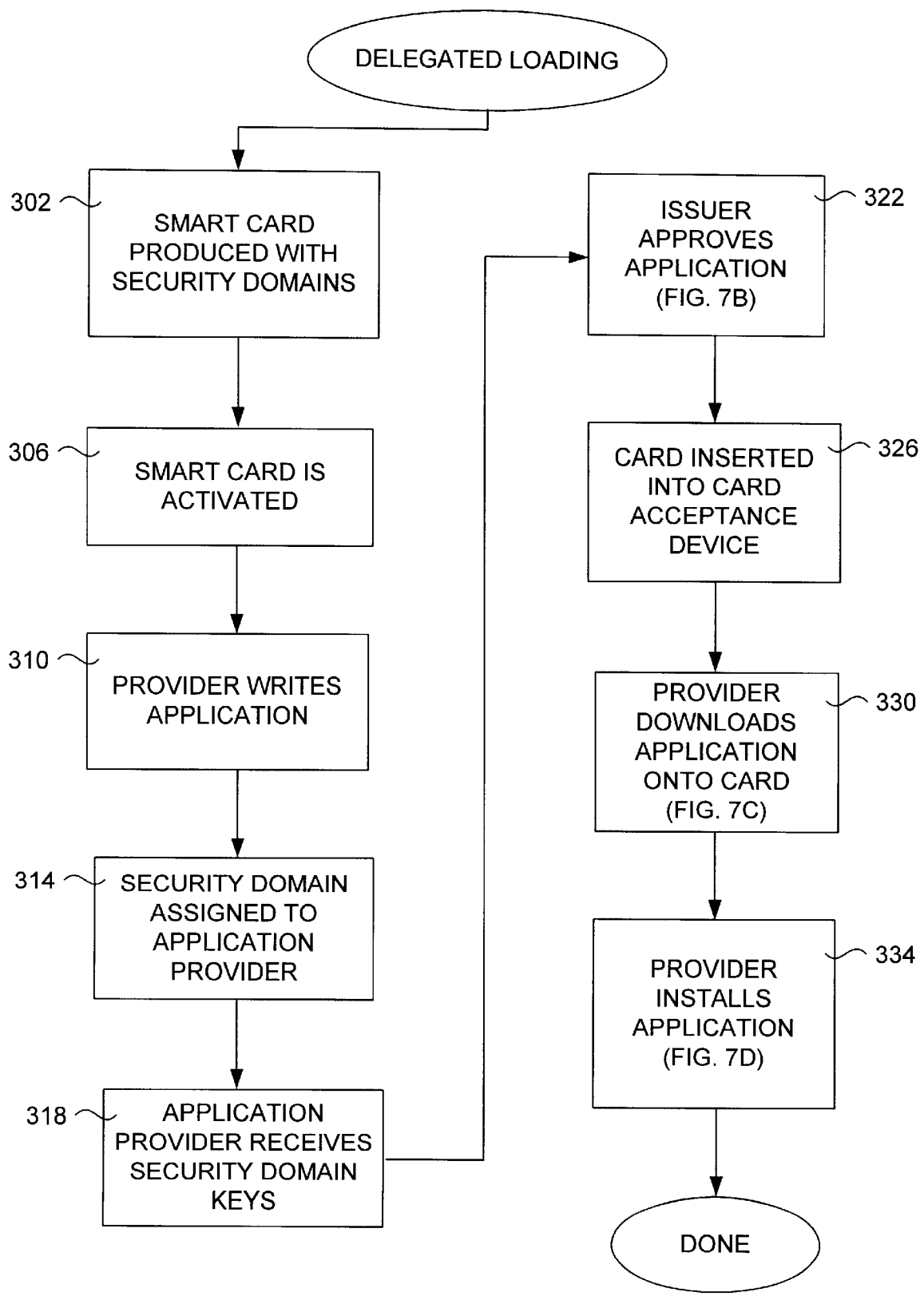
FIG. 7A is a flow diagram describing a technique for performing delegated loading.

FIG. 7A is a flow diagram describing a technique for performing delegated loading. As mentioned above, there are a variety of ways that a security domain may be present on a smart card and its secret keys provided to an application provider without the issuer or other application providers being involved. Step 302 refers to this process by which a smart card is manufactured, installed with operating software and security domains, and the keys of at least one security domain are kept secret from the issuer.

A group of keys associated with a particular security domain is referred to as a key set and is uniquely identified by a key set identifier. Each key within a key set is also uniquely identified by a key identifier. These keys in a key set may perform a wide variety of functions during smart card operation and include authentication, confidentiality, integrity, and key encryption. Later, the smart card is issued to a cardholder and becomes activated in step 306. At this point in time the card is in its secured state 208 and the cardholder is using the card.

At some point in time, an application provider may desire to write a new application for the card and place it onto the card post-issuance using delegated loading. A provider would choose this option to ensure that the secret keys of a security domain do not become available to another party. Accordingly, as a first step, a provider in step 310 writes a suitable smart card application in any suitable language such as JAVA, Visual Basic, Assembly Language, "C", etc. In a preferred embodiment, this application conforms to Open Platform API 110 and hardware independent API 122.

In step 314 one of the security domains on the card is assigned to the application provider. The provider may be assigned a security domain from the manufacturer who has kept a number of security domains in escrow from the time of card manufacture, or the provider may be allowed to load a new security domain in conjunction with a trusted third party. In conjunction with being assigned a security domain, in step 318 the application provider receives the secret key set corresponding to this security domain. These keys may have been held in escrow by the card manufacturer on behalf of the issuer, or these keys may be dynamically created by the application provider and loading onto the card along with a new security domain through the help of a trusted third party. Because the trusted third party has ownership of a security domain and its keys, it can assist the application provider in loading a new security domain with its new keys. Using either technique, the application provider receives ownership of a security domain on the smart card and its secret set of keys that have not been revealed to the issuer or another third party.

Figure 7B:
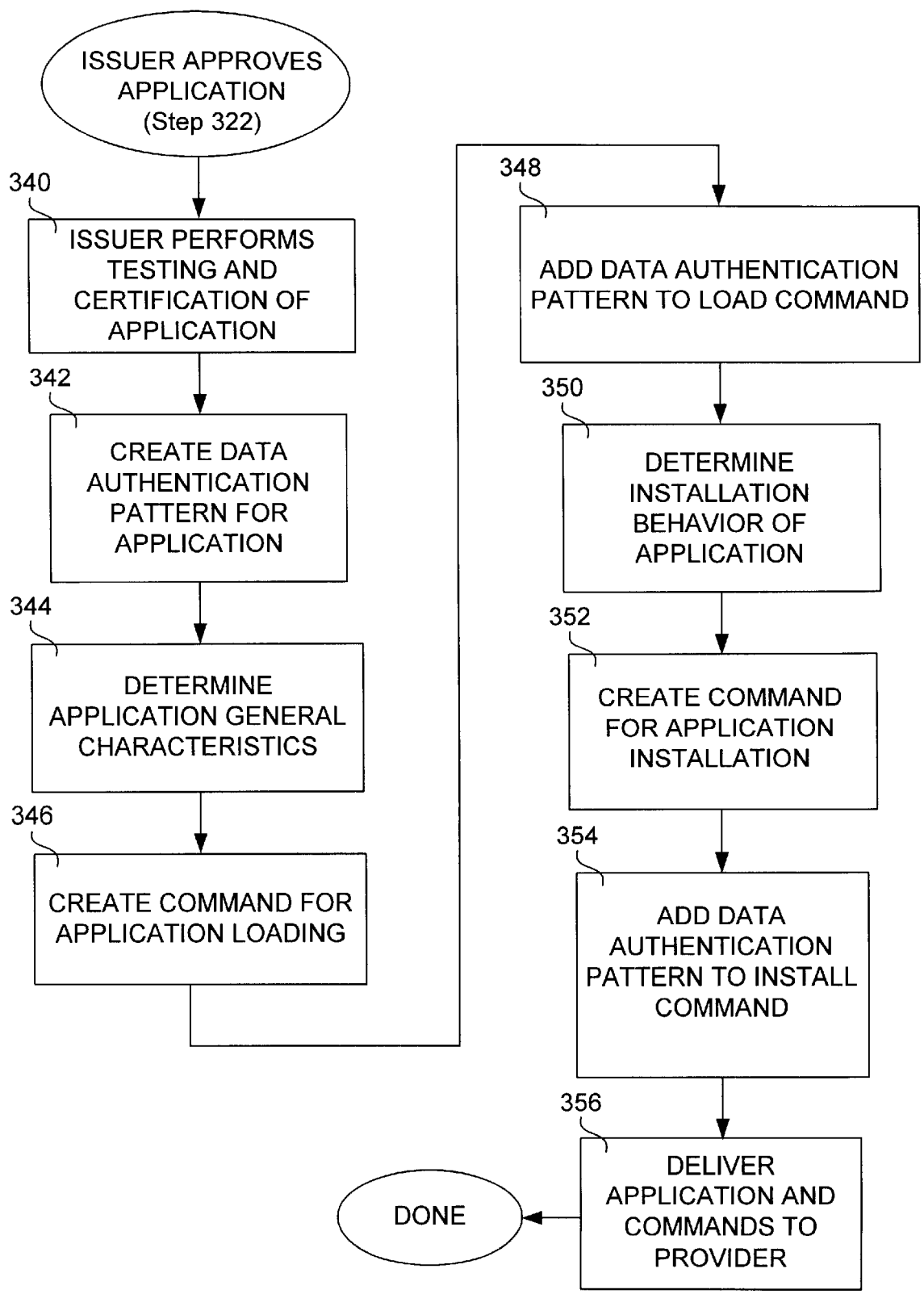
FIG. 7B is a flow diagram that describes how an issuer approves an application for delegated loading and installation.

In step 322 the issuer approves the application through a suitable arrangement with the application provider; this step is described in further detail in FIG. 7B. Through this step, the smart card onto which the application will be loaded becomes assured that the issuer has checked and approved of the application. It allows the issuer to keep a certain amount of control over the delegated loading process.

In step 326 a cardholder inserts the smart card into any suitable card acceptance device. This insertion may be part of a regular transaction for the cardholder or it may be a special transaction solely for the purpose of downloading the new provider application. In step 330 the provider downloads the new application onto the smart card in the card acceptance device; this step will be described in further detail in FIG. 7C. In this fashion, the loading of the application has been delegated to an application provider.

In step 334 the provider installs the application that has been loaded onto the smart card; this step will be described in further detail in FIG. 7D. Additionally, the provider may perform other functions for the application such as personalization. At this point, delegated loading and installation of an application onto the card has been performed.

FIG. 7B is a flow diagram that describes how an issuer approves an application for delegated loading and installation. Once an application provider has written an application for a smart card and desires to load that application onto an issuer's smart cards via the delegated loading process of the present invention, it provides the application to the issuer for approval. It should also be noted that the provider may also give the application to a trusted third party for approval. In step 340 the issuer performs testing of the application given to it by the application provider. Testing of an application for a smart card may be performed in any of a variety of ways and is a step understood in the art, and generally involves functional tests (optional) and security tests (mandatory). Testing of the application involves checking its operational behavior on a smart card, checking its operational memory requirements, etc., ensuring that the application is secure, and checking for viruses and card related threats. Once the issuer (or trusted third party) has tested the application and it to ensure that it behaves correctly, the application is "certified" and the issuer is ready to prepare the application for a delegated load and installation by the provider.

In step 342 creation of a data authentication pattern (DAP) may be performed in a variety of ways. In general a data authentication pattern is a sequence of bytes unique to a string of data such as a command or an application. By calculating a DAP for an application (for example) and delivering the DAP with the application, an entity such as a smart card can recalculate the DAP using the same cryptographic technique. By next comparing the received DAP to the newly calculated DAP the smart card can verify the integrity of the received command or application.

Creation of a DAP may be done in conjunction with either symmetric or asymmetric cryptography, or other suitable technique. In conjunction with symmetric cryptography, the information to be verified (such as a load command, and install command, an application, or a load file) is first assembled. Next, a function such as SHA-1 or MD5 is applied to the information to produce a hash (a unique sequence). Next, a symmetric key is applied to the hash to encrypt it. This unique encrypted sequence is referred to as the data authentication pattern (DAP). In one embodiment, a message authentication code (MAC) may be used to implement a DAP. The DAP may then be appended to the clear text of the information for transmission. On the receiving end (for example inside the smart card), the application (for example) and its appended DAP are received. Next, the same technique is applied to the application using the same cryptographic algorithm as before to produce a new DAP for the application. Assuming the application has not been changed enroute, the newly created DAP should match the DAP received appended to the application. A difference in the two DAPs will indicate that the integrity of the application has been compromised.

In a preferred embodiment of the invention, asymmetric cryptography is used to produce a data authentication pattern for either of the commands or for the application itself. For example, public key/private key cryptography may be used to provide a unique data authentication pattern that the smart card may verify. In this example, the issuer maintains a public key/private key pair. The private key is used by the issuer when approving the application; i.e., the issuer creates data authentication patterns for the commands and for the application. The private key is used to sign a cryptographic hash of the command or the application which then becomes the unique data authentication pattern. The issuer's public key held by the card manager is used to verify the data authentication pattern received along with either a command or an application. That is, the smart card uses the issuer's public key to verify the DAP for the application. As above, if the application has not been changed, the newly created DAP should match the received DAP.

Next, in step 344 the issuer determines general characteristics of the application to send along with the application code in a secure manner. These general characteristics of an application include the name of the application (or its applications identifier), an identifier for the security domain to which the application has been assigned by the issuer, the memory limitations of the application, and any privileges that application may require on the card.

The memory requirements of an application include how much persistent memory an application requires for storage and how much RAM it requires during execution. Privileges of an application include whether or not the application can block the card, whether the application can lock the card manager, whether the application can change the card global PIN, and others. If the application to be loaded in a delegated fashion is a security domain, the privileges granted to the security domain may include whether or not the security domain has the delegated management privilege and whether or not the security domain has the capability to verify data authentication patterns from other applications loaded in a delegated fashion.

Figures 8, 9, 10:
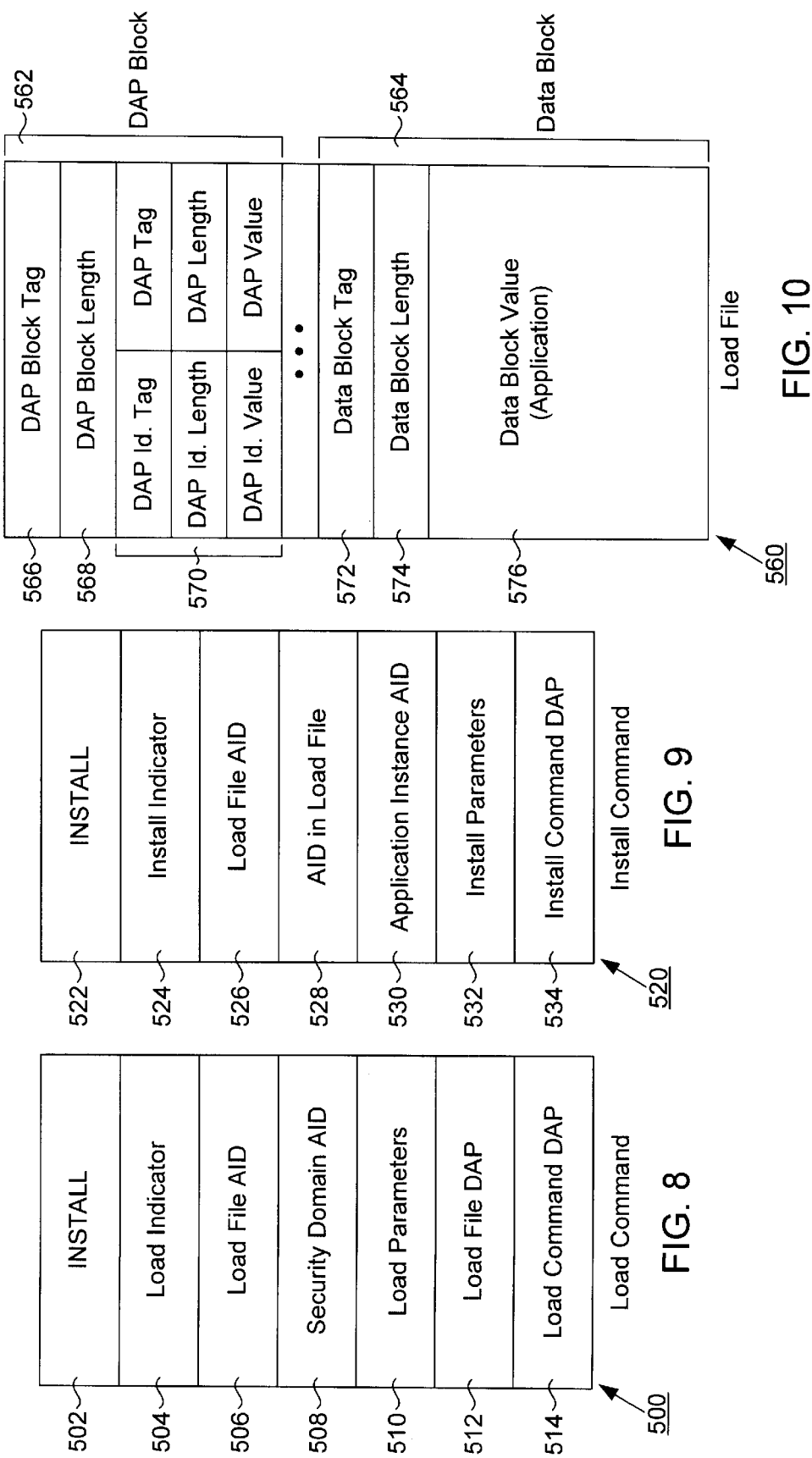
FIGS. 8 and 9 illustrate examples of a load and an install command that may be created in steps 346 and 352 of FIG. 7B.
FIG. 10 illustrates a load file containing an application according to one embodiment of the invention.

In step 346 a command is assembled for loading the application onto the smart card. This load command includes the application characteristics determined in step 344 and may include other information particular to the type of command protocol being used. Preferably, this load command has appended to it the data authentication pattern created for the application in step 342. By combining the pattern and the application, it is ensured that the application received and approved by the issuer is the same file that will subsequently be received by the card manager on the card. An exemplary load command is shown in FIG. 8.

In step 348 a data authentication pattern is created for the load command generated in step 346. It will be appreciated that generation of this pattern for the entire load command may be performed in many ways. In a preferred embodiment of the invention, the pattern for the load command is calculated for the entire load command including the general characteristics it contains as well as the data authentication pattern for the application. Preferably, a load command calculation key known only to the issuer is used to calculate this data authentication pattern of step 348. In one embodiment of the invention, this load command may appear as shown in FIG. 8 and is based upon a standard APDU command under ISO 7816-4.

Step 350 determines the installation behavior of the application. The information determined in the step provides instructions for the card on what to do with an application when it is installed. This information allows the card to correctly install an application on the card that has previously been loaded onto the card. For example, this information includes the life cycle state in which the application should be when installed on the card, instructions for installing the application, and other information.

In step 352 a command is created for installation of the application on the card and includes the information determined in step 350. Preferably, this installation command does not include the data authentication pattern for the application, although it may. In step 354, a data authentication pattern of the entire install command created in step 352 is appended to the end of the install command. Preferably, an install command calculation key known only to the issuer is used to create this data authentication pattern. In one embodiment of the invention, this install command with its appended data authentication pattern may appear as shown in FIG. 9 and may be implemented using the APDU Install command under the ISO 7816-4 protocol.

In step 356 the assembled load and install commands (along with their data authentication patterns) and the tested and certified application (along with its data authentication pattern) are delivered to the application provider. The application provider is now enabled to perform either the delegated load or a delegated installation. Through the use of the data authentication pattern, not only are the application and the commands locked (e.g., a change in one of them would be detected), but the identity of the issuer and its approval of the application is supplied via the secret issuer keys used to calculate the data authentication pattern for the application and the load and install commands. In this fashion, even though a party other then the issuer is allowed to load or install an application, the smart card will recognize that it is authorized to load or install the application by verifying the data authentication patterns that have been created. Such use will now be described.

Figure 7C:
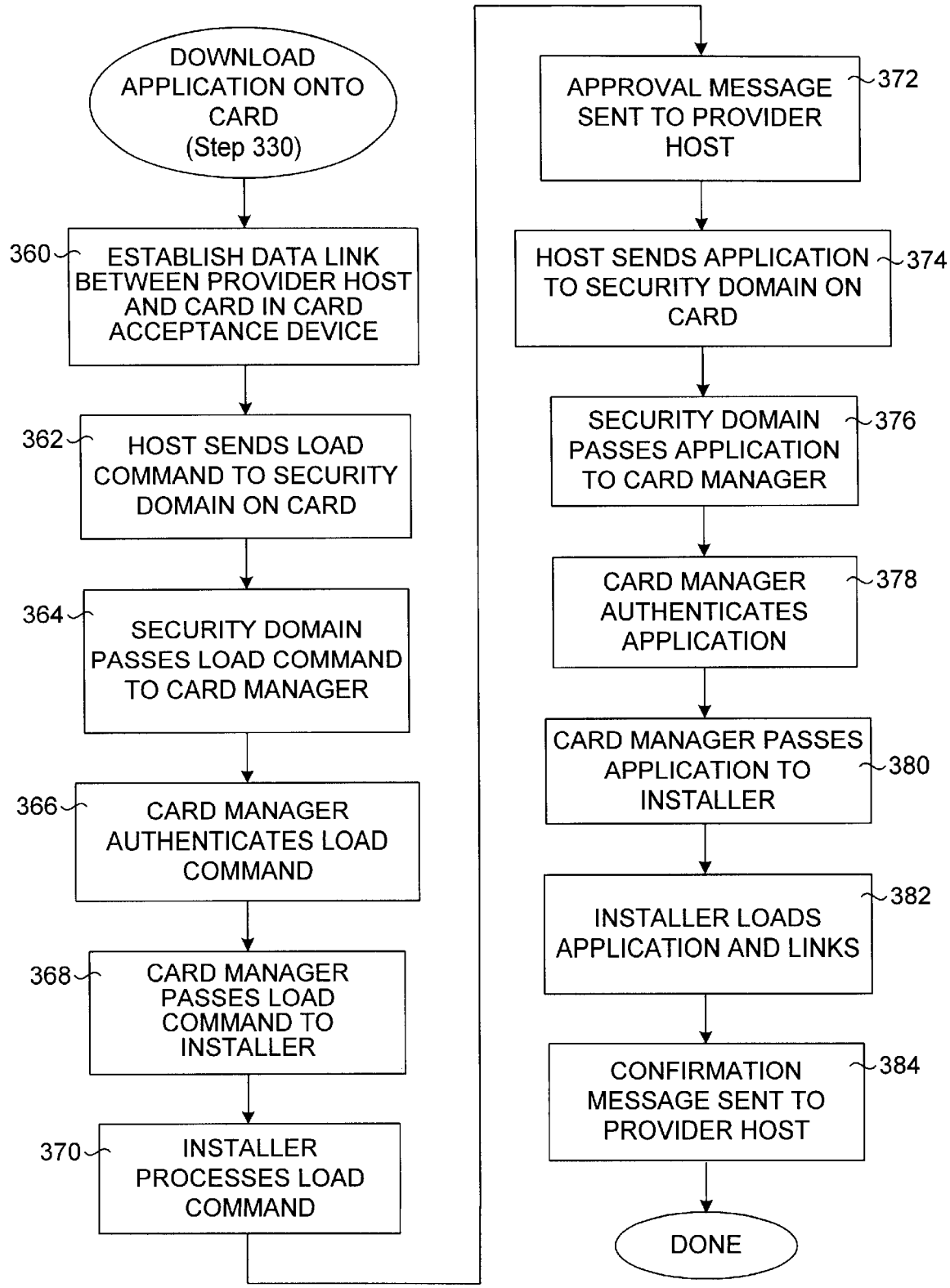
FIG. 7C is a flow diagram describing one embodiment of the download application step of FIG. 7A.

FIG. 7C is a flow diagram describing one embodiment of the download application step of FIG. 7A. In step 360 a data link is established between host computer 602 and smart card 604 while the card is in a card acceptance device. Preferably, as part of this procedure, a mutual authentication process is performed between the card and the host using a key set provided to the application provider by the issuer or other trusted third party (as previously described). Preferably, the security domain keys provided to the application provider are used so as to assure security domain 106 that the incoming information is coming from an authorized source are only seen by the application provider. In step 362, host 602 sends load command 500 to security domain 106 using APDU interface 610. In essence, this is a request for a load of an application.

Once the security domain has received the load command, in step 364 it passes the command to card manager 104. Because this command is coming from a security domain, the card manager knows that the load command is part of a delegated load process.

In step 366 the card manager authenticates the load command. Preferably, the card manager uses the same cryptographic technique used by the issuer to create load command DAP 514 to verify the load command DAP on its own. The card manager then compares its created pattern with pattern 514 included with the load command in order to authenticate that the load command received from the application provider is the same load command that had been previously created and approved by the issuer. As described above, creation of load command DAP 514 may be done using a variety of cryptographic techniques and using either asymmetric or symmetric cryptography.

In step 368 the card manager passes the authenticated load command to install routine 614 which process the load command. Preferably, processing of the load command is performed as is normally done for a first APDU Install command that has been received from an issuer. In other words, the installer is unaware that the load command is part of a delegated load operation and process the command as if it were loading an application received directly from the issuer. In general, this processing checks to see if an installation of the application can be allowed. For example, the process checks whether the application is already installed, whether there is memory available, whether the needed libraries are present, whether the right version of the operating system or runtime environment is present, etc. Once approved by the installer, the installer sends an approval message back through the card manager and security domain to host computer 602. Upon receiving the approval message, the host computer is alerted that loading of the application has been approved.

Accordingly, in step 374 the host sends the application to security domain 106 over links 620. Preferably, included with the application is the data authentication pattern previously created for it by the issuer. In a preferred embodiment, the application is embedded within a load file such as is illustrated in FIG. 10 which itself is part of an APDU Load command. Of course, the application may be embodied in other types of commands, need not necessarily be part of a load file, or simply may be transmitted by itself along with it data authentication pattern. As with the load command, in step 376 the security domain passes the application on to the card manager. In step 378 the card manager authenticates the application by verifying its data authentication pattern that was created by the issuer previously. As mentioned above, the card manager may authenticate the data authentication pattern of the application using any of a variety of cryptographic techniques. If any authentication fails, the original memory contents are restored.

In step 382 the installer loads the actual application code into memory of the smart card and performs linking to any run-time libraries and other necessary steps. As mentioned above, in a preferred embodiment, the installer performs a load by processing one or more APDU Load commands that contain the application. Assuming that loading and linking was performed successfully, in step 384 a confirmation message is sent from the installer to provider host computer 602 via the card manager and the security domain. Once host 602 has received the confirmation, it is notified that the application has been loaded successfully.

In one embodiment of step 384, the confirmation message takes the form of a load receipt. The load receipt provides confirmation from the card that a successful load of the application has occurred through the delegated loading process. Preferable, the load receipt includes unique data related to the delegated loading transaction and a data authentication pattern applied by the card manager. By having the card manager apply the data authentication pattern using a key known only to the issuer, the issuer can be assured upon later receipt of the load receipt that in fact the delegated load of the application was performed successfully. In one embodiment, the load receipt is returned in the data field of the response message from the last APDU load command sent to the security domain.

Construction of a load receipt and calculation of a data authentication pattern may be performed in a variety of ways. By way of example, the data authentication pattern is calculated using data unique to the loading transaction and a card manager load receipt calculation key known only to the issuer. Preferably, the card manager calculates the data authentication pattern and constructs the load receipt. Information upon which the data authentication pattern is calculated using the key may include: a confirmation counter (which is used to indicate the number of times an application has been loaded on a single card), card unique data (such as a unique card identifier), the load file AID, and the security domain AID. The load receipt key is then applied to this information to generate the load receipt data authentication pattern. The load receipt is then constructed by concatenating the load receipt DAP with the confirmation counter and identification data for the card. In this fashion a provider may later provide the load receipt to the issuer to confirm that the provider's application was successfully loaded onto a particular smart card.

Figure 7D:
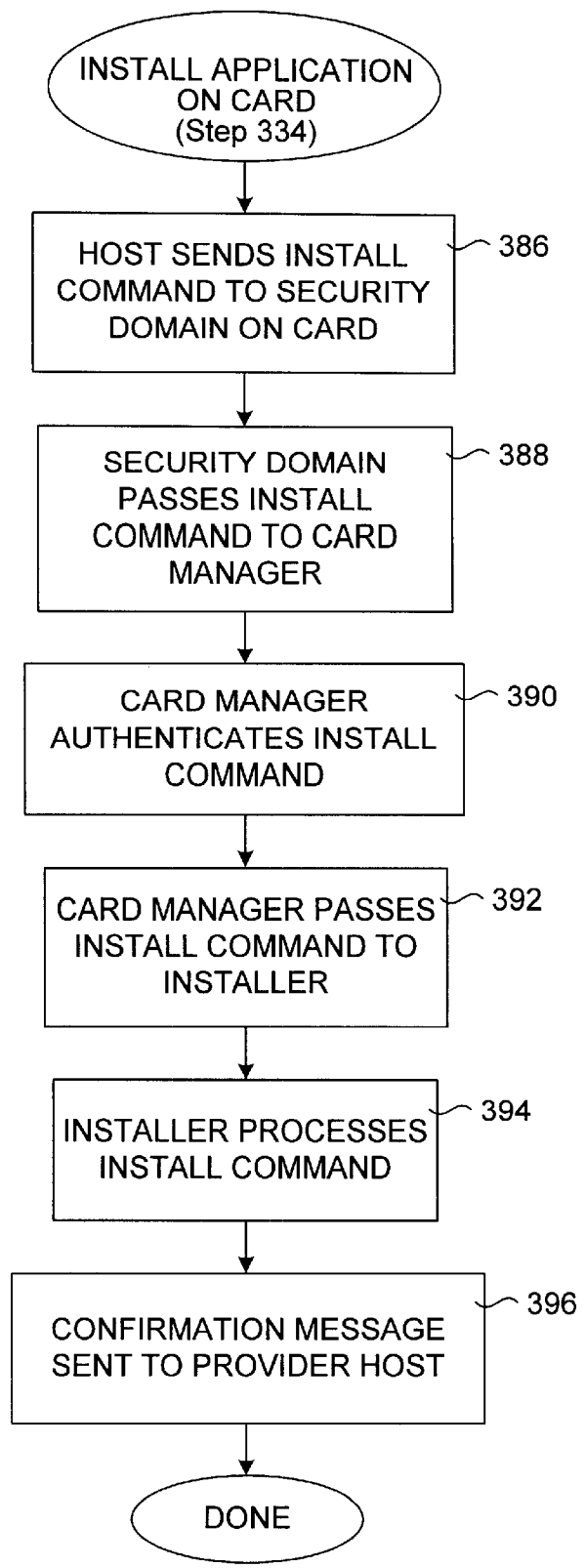
FIG. 7D is a flow diagram describing the install application step of FIG. 7A.

FIG. 7D is a flow diagram describing the install application step of FIG. 7A. In step 386, host 602 sends install command 520 to security domain 106 using APDU interface 610. In essence, this is a request for an install of an application. Preferably, the security domain keys provided to the application provider previously by the issuer are used so as to assure security domain 106 that the incoming information is coming from an authorized source.

Once the security domain has received the install command, in step 388 it passes the command to card manager 104. Because this command is coming from a security domain and not from an issuer off-card, the card manager knows that the install command is part of a delegated install process.

In step 390 the card manager authenticates the install command. Preferably, the card manager uses the same cryptographic technique used by the application provider to create install command DAP 534 to recreate the install command DAP on its own. The card manager then verifies the signature pattern included with the install command in order to authenticate that the install command received from the application provider is the same install command that had been previously created and approved by the issuer. As described above, creation of install command DAP 534 may be done using a variety of cryptographic techniques and using either asymmetric or symmetric cryptography.

In step 392 the card manager passes the authenticated install command to the install routine 614 which processes the install command. In step 394 the installer process the install command which instructs the card to take certain actions with respect to the application recently loaded. These actions may include but are not limited to allocating data space, placing the application into an initial state and setting additional privileges such as default selection and making the application available for selection.

Preferably, processing of the install command is performed as is normally done for a second APDU Install command that has been received from an issuer. In other words, the installer is unaware that the install command is part of a delegated install operation and process the command as if it were installing an application at the direction of the issuer.

In step 396 a confirmation message is sent back to the provider host via the card manager and security domain in much the same way as in step 384.

In one embodiment of the invention, the confirmation message of step 396 takes the form of an install receipt that may be produced in the same fashion as the load receipt of step 384. The install receipt provides confirmation from the card that a successful installation of the application has occurred through the delegated installation process. Preferable, the install receipt includes unique data related to the delegated installing transaction and a data authentication pattern applied by the card manager. By having the card manager apply the data authentication pattern using a key known only to the issuer, the issuer can be assured upon later receipt of the install receipt that in fact the delegated install of the application was performed successfully. In one embodiment, the install receipt is returned in the data field of the response message from the last APDU Install command sent to the security domain.

Construction of an install receipt and calculation of a data authentication pattern may be performed in a variety of ways. By way of example, the data authentication pattern is calculated using data unique to the installing transaction and a card manager install receipt calculation key known only to the issuer. Preferably, the card manager calculates the data authentication pattern and constructs the install receipt. Information upon which the data authentication pattern is calculated using the key may include: a confirmation counter, card unique data (such as a unique card identifier), the load file AID, and the application instance AID. The install receipt key is then applied to this information to generate the install receipt data authentication pattern. The install receipt is then constructed by concatenating the install receipt DAP with the confirmation counter and identification data for the card. In this fashion a provider may later provide the install receipt to the issuer to confirm that the provider's application was successfully installed onto a particular smart card.

FIGS. 8 and 9 illustrates examples of a load and an install command that may be created in steps 346 and 352 of FIG. 7B. Those of skill in the art will appreciate that these commands may take any of a variety of forms and may have fields that occur in different orders. In a preferred embodiment of the invention, these commands are implemented according to the APDU protocol such as described in the "Open Platform Card Specification" referred to above. Install 502 indicates that this is an APDU Install command. This command may be used to either load an application or install an application. A load indicator 504 indicates that a load file containing an application is to be loaded. A load file application identifier 506 contains a unique identifier for the application contained in the load file. A security domain application identifier 508 indicates to which security domain the application to be loaded belongs. Load parameters 510 specify additional information that may be required by the card to load the application. These parameters may include any of the application general characteristics determined in step 344. A data authentication pattern 512 for the load file uniquely identifies the load file and/or the application and may be created as described in step 342. The data authentication pattern 514 for the entire load command 500 may be created as described in step 348.

Install 522 indicates that this is an APDU Install command. An install indicator 524 indicates that an application is to be installed. A load file application identifier 526 contains a unique identifier for the application contained in the load file. An application identifier 528 in the load file identifies a particular application in the load file since one load file may contain multiple applications. An application instance identifier 530 specifies the identifier which will be established for selection of the newly installed application.

Install parameters 532 specify additional information that may be required by the card to install the application. These parameters may include any of the application installation behavior determined in step 350. The data authentication pattern 534 for the entire install command 520 may be created as described in step 354.

FIG. 10 illustrates a load file 560 containing an application according to one embodiment of the invention. It should be appreciated that an application to be loaded onto a card may be embedded within a load file, as shown, may be loaded simply by itself, or may be loaded in combination with other applications and information. In a preferred embodiment of the invention, an application is embedded within a load file using tag-length-value format. Load file 560 includes any number of data authentication pattern (DAP) blocks 562 followed by a data block 564 which includes the application. There may be multiple DAP blocks 562 that precede a data block 564. Each DAP block would correspond to a different entity that wishes to review and certify the application before it is allowed to be loaded onto a smart card. For example, even though an issuer may wish to provide its own DAP block for an application, there may be a regulatory agency that also wishes to review and certify the application and add its own data authentication pattern for the application. In this way, multiple entities can approve an application to be loaded onto a smart card. During the loading or installation process, the card manager or a security domain which represents an entity can verify that the data authentication pattern earlier added by that entity has not changed. It is also conceivable that there is no DAP block 562 present with an application. In this scenario, a data authentication pattern may still be calculated for the application itself but need not appear in a formal DAP block. The data authentication pattern for the application may then be directly appended to the application itself, or may appear in an install command.

In one embodiment of the invention, an application is embedded within a load file 560 as illustrated in FIG. 10. In this embodiment, any number of DAP blocks 562 precedes a data block 564 which are each structured in tag-length-value format. A load file is the physical data file that is transferred to a smart card in order to make changes to the card contents. In other words, one or more DAP blocks may be used for the integrity verification of the application.

DAP block 562 includes identification information as well as the related authentication pattern. Tag 566 indicate that what follows is a DAP block. Length 568 indicates the length of the DAP block value to follow. The DAP block value 570 includes identification information and the value of the authentication pattern. An identifier tag indicates that an identifier is to follow. An identifier length indicates the length of the identifier, and an identifier value identifies the entity associated with DAP block 562 that has provided the authentication pattern for the following data block 564. Next, within value 570 a DAP tag indicates that an authentication pattern is to follow. A DAP length indicates the length of the pattern and finally a DAP value provides the actual data authentication pattern providing integrity verification for the application.

Data block 564 includes a data block tag 572 indicating that a data value (an application) is to follow. Data block length 574 indicates the length of the following value. Data block value 576 includes the application to be loaded. Value 576 may contain one or more applications and/or any combinations of library and support files.

In one specific embodiment of the invention, tag 566 has as value of 'E2', DAP identifier tag and DAP tag of 570 have values of '4F' and 'C3', respectively, and tag 572 has a value of 'C4'. Also, DAP block 562 is optional. Even if present, DAP block length 568 may be set to '00'.

A load file may be transported onto the card either via card manager 104 or a security domain that has the delegated management privilege. Card manager 104 preferable is responsible for the physical memory management and life cycle management of a load file. A load file may have two life cycle states which are "Loaded" and "Logically Deleted." All load files present on the card and available for use are in the Loaded state. Any load file which has been requested to be deleted by the card manager or a security domain but cannot be physically deleted is in the state Logically Deleted and cannot be accessed. Loading an application involves first loading the load file onto the card, and then extracting the application and installing it. Alternatively, the load file is processed dynamically during the loading transaction during which the application is extracted. In this alternative embodiment, the remainder of the load file is disregarded and the load file never exists on the card.

Figure 11:
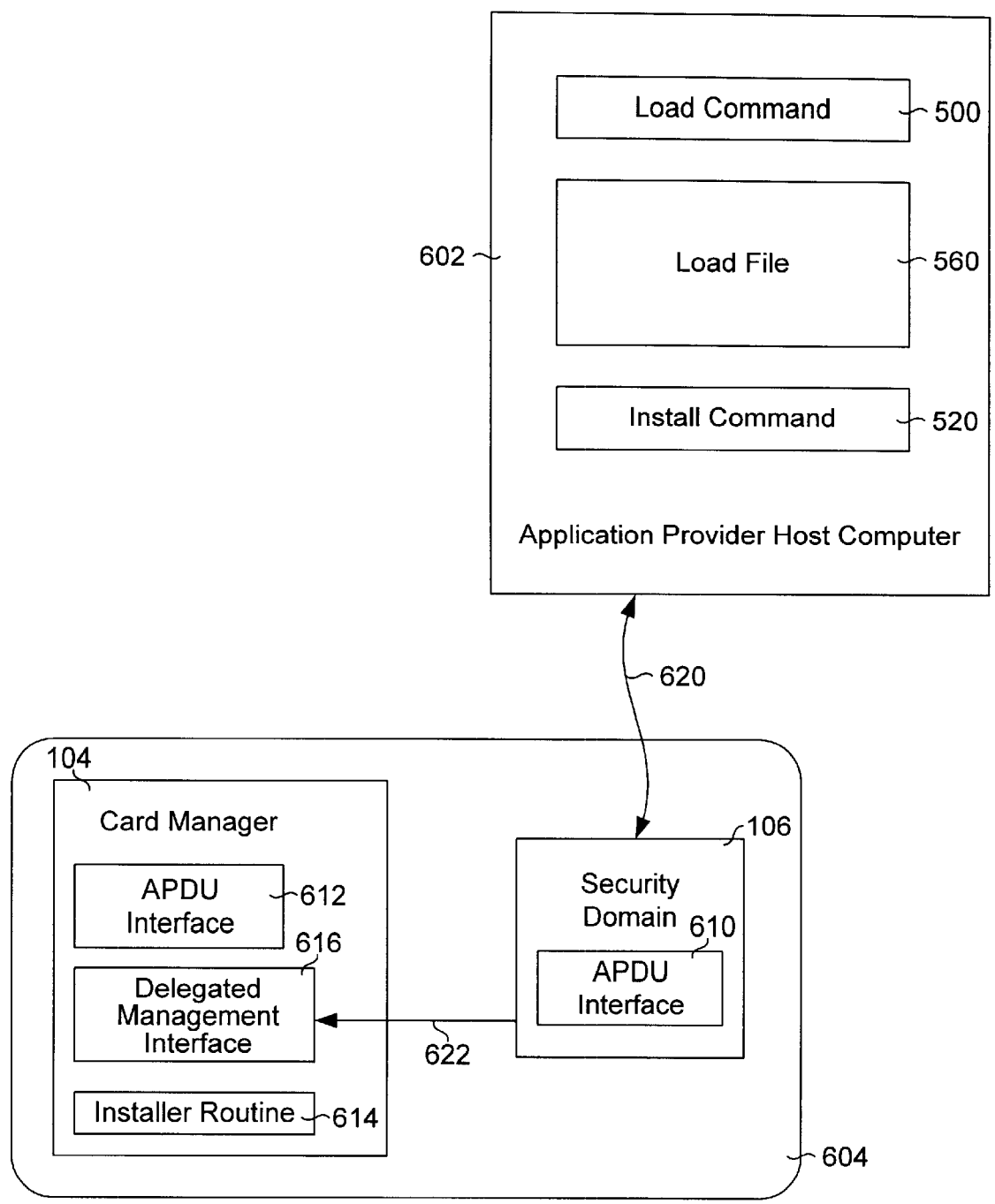
FIG. 11 illustrates an embodiment in which an application may be downloaded from an application provider host computer to a smart card in a delegated manner.

FIG. 11 illustrates an embodiment in which an application may be downloaded from an application provider host computer 602 to a smart card 604 in a delegated manner. Host computer 602 is any suitable computing device under control of an application provider that includes the load command 500, load file 560 and install command 520 that have been approved and received from the issuer.

Smart card 604 includes card manager 104, security domain 106 and other typical features of a smart card (not shown). Security domain 106 and card manager 104 each include an APDU interface, 610 and 612 respectfully, that allow an outside entity to communicate with them. Additionally, card manager 104 includes an installer routine 614. Installer 614 is a known low-level memory management routine that accepts application code and other information and writes it to memory.

In the prior art, an issuer by virtue of its secret keys would be able to talk directly to card manager 104 through APDU interface 612 to provide an application to be loaded onto the card. Installer 614 would accept this application via the card manager and install the application in the memory of the smart card. For security, the keys to access card manager 104 would not be accessible to parties other then the issuer, meaning that only an issuer could download an application. Through use of the present invention, a third party application provider is able to perform a delegated load of an application via security domain 106. Using keys previously received under an arrangement with an issuer, host computer 602 establishes a secure communication channel 620 to security domain 106 of smart card 104 in any suitable card acceptance device (not shown).

Security domain 106 then manages the downloading of load command 500, load file 560 and install command 520 onto smart card 604. In this fashion, these commands and the load file may then be delivered via an internal link 622 to card manager 104 using a delegated management interface 616. The card manager then passes the commands and load file to installer 614 for loading and installing an application onto a smart card. Installer 614 receives and process these commands from security domain 106 in much the same way as if these command had been received from an issuer via card manager 104. Further, the data authentication pattern present in the commands and in the application may be checked by the card manager to ensure the authenticity and integrity of the information as established by the issuer. Further details on loading and installation are provided in FIG. 7C.

Delegated Deletion of an Application

Figure 12:
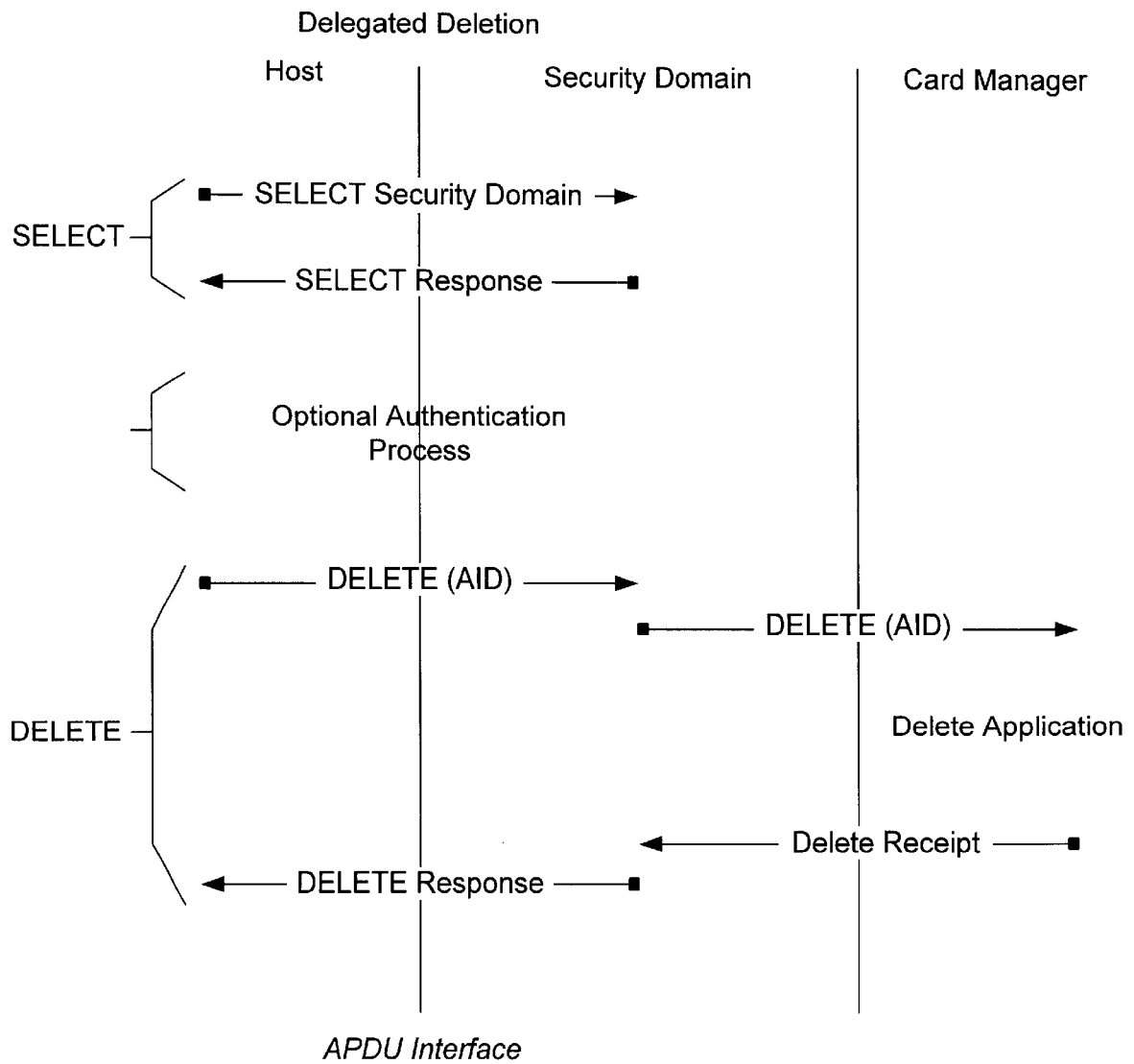
FIG. 12 is a flow diagram describing a technique for performing delegated deletion.

Application providers have the ability to instruct the card manager to delete applications that they own. The card manager will honor these requests without authorization from the card issuer. Therefore, there is no requirement for a delete token for to be included with a Delete command passed from an application provider's security domain to the card manager. Once a Delete command is received by the card manager, the card manager verifies that the application being requested for deletion belongs to the security domain that issued the command. After verifying this information, the card manager carries out the deletion and then returns a response that includes a DAP generated by the card manager. This response including the DAP is referred to as the Delete Receipt. FIG. 12 is a flow diagram describing a technique for performing delegated loading.

In a preferred embodiment of the invention, a card undergoing a deletion is in a particular state. For example, the card manager life cycle state is Secured, the security domain to be used is in the state Personalized and has the delegated management privilege. Preferably, the APDU sequence used is first a Select command indicating a security domain, then an optional authentication process, followed by a Delete command referencing a particular application identifier (AID).

In one embodiment, the card manager uses the following techniques for application removal. Application removal may involve the removal of application instance as well as the associated Load file. Physical removal may occur in mutable persistent memory while only logical removal is possible in immutable, persistent memory. For applications instances or Load files loaded into mutable persistent memory, the card manager: deletes the identified application instance or Load File from mutable persistent memory; reclaims the mutable persistent memory space for future use; and removes the AID of the removed application or Load file from the card registry. For application instances or Load files loaded into immutable persistent memory, the card manager: deletes related application data space (if any) contained in mutable persistent memory; and changes the life cycle state of the deleted application and/or Load file(s) in the card registry from the current state to Logically Deleted.

Alternative Embodiments

In an alternative embodiment, the delegation mechanism mentioned above may be used to allow the issuer to outsource loading and management functions potentially to a single (or multiple) party who can then represent the issuer to other application providers in the event that an application provider does want the issuer (or his representative) to load the application provider's application. For example, a first service provider is the owner of one security domain on a card and a second service provider is the owner of another security domain on the card. The card issuer has a contract with the first service provider for delegated loading and a contract with the second service provider, but not for loading. The application provider has a contract with the second service provider for application personalization. At the request of the application provider, the first service provider loads the application (using the first security domain) and the second service provider personalizes the application (using the second security domain). The provider is then allowed to use the application on the card.

Computer System Embodiment

Figure 13:
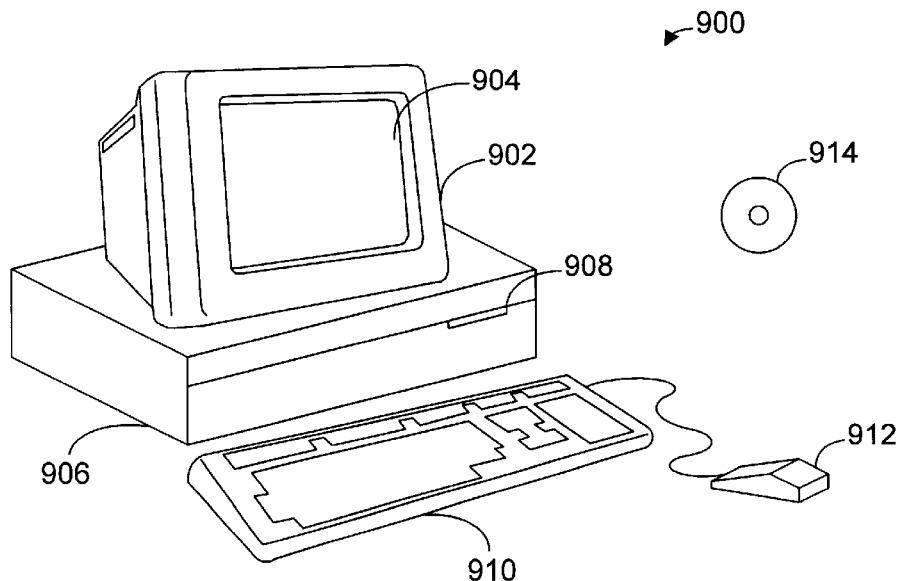
FIGS. 13 and 14 illustrate a computer system suitable for implementing embodiments of the present invention.
Figure 14:
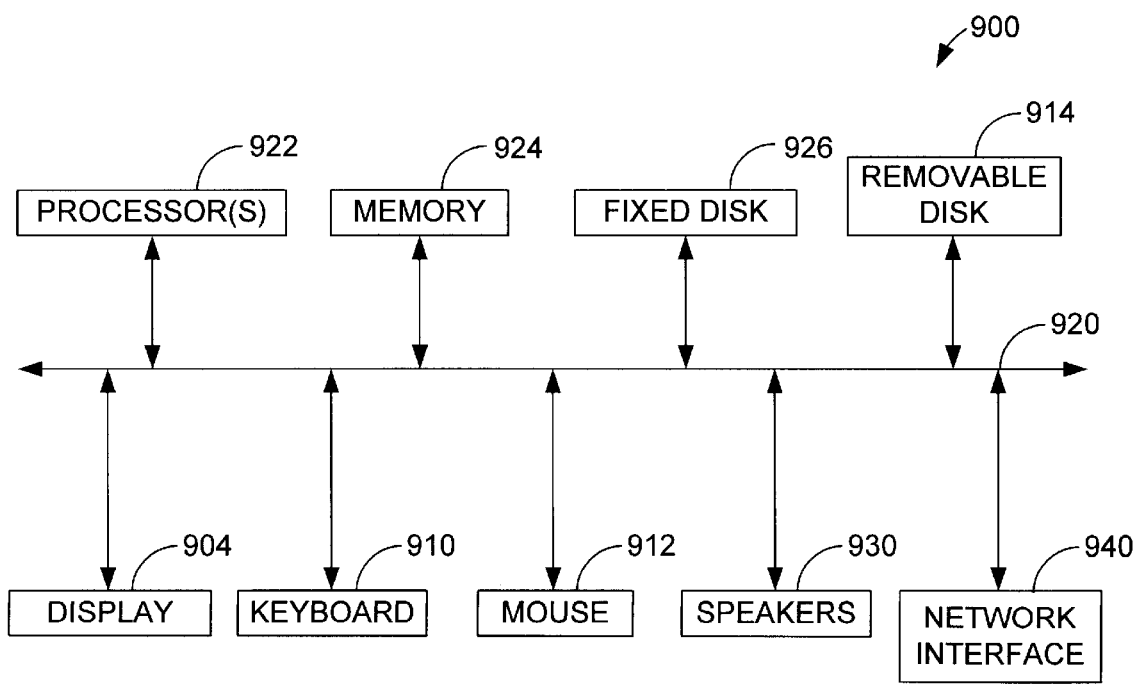

FIGS. 13 and 14 illustrate a computer system 900 suitable for implementing embodiments of the present invention, such as any of the computers used in the systems shown in FIG. 1. FIG. 13 shows one possible physical form of the computer system. Of course, the computer system may have many physical forms ranging from an integrated circuit, a printed circuit board and a small handheld device up to a huge super computer. Computer system 900 includes a monitor 902, a display 904, housing 906, a disk drive 908, a keyboard 910 and a mouse 912. Disk 914 is a computer-readable medium used to transfer data to and from computer system 900.

FIG. 14 is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary storage medium (such as a hard disk) that is slower than primary storage. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

We claim:

1. A method of delegated loading of an application onto a smart card, said method comprising:

assigning a security domain of the smart card to an application provider;

providing a key set to application provider for the security domain assigned to the application provider, wherein the key set is not known to the issuer of said smart card;

approving of said application by an issuer of said smart card, wherein the approving of said application by an issuer of said smart card, comprises:
  certifying said application;
  creating a data authentication pattern for said application;
  creating a command for loading said application;
  adding said data authentication pattern to said load command;
  creating a command for installing said application;
  adding said data authentication pattern to said install command; and
  delivering said commands to said application provider;
inserting the smart card into the card acceptance device subsequent to the steps of approving said application, creating said application authentication pattern, and appending said application authentication pattern, and prior to the steps of receiving the load command, and verifying said load command, wherein said delegated loading is performed after issuance of said smart card to a consumer;
receiving a load command from the application provider via a card acceptance device, said load command including an indication of an application to be loaded and an appended command authentication pattern;
verifying said load command using said command authentication pattern;
receiving said application from the application provider via said card acceptance device, said application including an appended application authentication pattern;
verifying said application using said application authentication pattern; and
loading said application into memory of said smart card, whereby said application provider is allowed to load said application onto said smart card.

2. A method as recited in claim 1 wherein said command authentication pattern is generated by an issuer of said smart card using a cryptographic technique, and wherein verifying of said load command includes:
  recalculating said command authentication pattern from said load command using said cryptographic technique, whereby said command authentication pattern and said recalculated command authentication pattern may be compared to provide verification of said load command.

3. A method as recited in claim 1 further comprising:
  receiving an install command from an application provider via a card acceptance device, said install command including an indication of an application to be installed and an appended install authentication pattern;
  verifying said install command using said install authentication pattern; and
  installing said application on said smart card, whereby said application provider is allowed to install said application onto said smart card.

4. A method as recited in claim 3 further comprising:
  receiving a load command from an application provider via a card acceptance device, said load command including an indication of an application to be loaded and an appended load authentication pattern;
  verifying said load command using said load authentication pattern; and
  loading said application on said smart card, whereby said application provider is allowed to load said application onto said smart card.

5. A system for delegated loading of an application onto a smart card, said system comprising:
  a host computer under control of an application provider;
  a software application included in said host computer to be loaded onto a smart card, said application including an appended application authentication pattern produced by an issuer of said smart card that verifies said application to said smart card;
  a smart card acceptance device linked to said host computer; and
  a smart card included in said card acceptance device, said smart card including code arranged to verify said application using said application authentication pattern, whereby said application provider is allowed to load said application onto said smart card.

6. A system as recited in claim 5 wherein said host computer comprises:
  computer code to assign a smart card security domain to the application provider;
  computer code for providing a key set to the application provider for the security domain assigned to the application provider, wherein the key is not known to the issuer of the smart card.

7. A system as recited in claim 6 further comprising:
  a load command included in said host computer said load command comprising an appended command authentication pattern and code for loading said software application; and
  code within said smart card arranged to verify said load command using said command authentication pattern, whereby said application provider provides said load command to said smart card.

8. A system as recited in claim 7 further comprising:
  an install command included in said host computer said install command comprising an appended install authentication pattern and code for installing said software application; and
  code within said smart card arranged to verify said install command using said install authentication pattern, whereby said application provider provides said install command to said smart card.

9. A system as recited in claim 6 further comprising:
  an install command included in said host computer that has an appended install authentication pattern; and
  code within said smart card arranged to verify said install command using said install authentication pattern, whereby said application provider is provide said install command to said smart card.

10. A method as recited in claim 6 wherein said cryptographic technique provides authentication and integrity for said application.

11. The system as recited in claim 5 further comprising:
  a network connection linked to the smart card issuer;
  computer readable code for sending the application from application provider to the smart card issuer;
  computer readable code for receiving the approved application and an appended application authentication pattern from the smart card issuer; and
  a storage device for storing the application and the appended application authentication pattern.

12. A method of delegated installation of an application on a smart card from an application provider, said method comprising:
  sending an application from the application provider to a smart card issuer for approval;

receiving an approval application with an appended install authentication pattern from the smart card issuer;

storing the approved application and appended install authentication pattern at the application provider;

loading the stored approved application onto a smart card from the application provider;

receiving an install command from an application provider via a card acceptance device, said install command including an indication of said application to be installed, install parameters and an appended install authentication pattern;

verifying said install command using said install authentication pattern; and installing the approved application on said smart card, whereby said application provider is allowed to install said application on said smart card.

13. A method as recited in claim 12 wherein said install authentication pattern is generated by an issuer of said smart card using a cryptographic technique, and wherein verifying of said install command includes:

recalculating said install authentication pattern from said install command using said cryptographic technique, whereby said install authentication pattern and said recalculated install authentication pattern may be compared to provide verification of said install command.

14. A method as recited in claim 12 further comprising:

approving of said install command by an issuer of said smart card;

creating said install authentication pattern;

appending said install authentication pattern to said install command, whereby said smart card is reliably assured that said install command has been approved by said issuer; and inserting the smart card into the card acceptance device subsequent to recalculating said install authentication pattern creating said install authentication pattern, and appending said install authentication pattern.

15. A method as recited in claim 14 wherein said delegated install is performed after issuance of said smart card to a consumer.

16. A method as recited in claim 15 further comprising:

assigning a security domain of the smart card to the application provider; and providing a key set to the application provider for the security domain assigned to the application provider, wherein the key set is not known to an issuer of said smart card.

* * * * *